(12) United States Patent
Suzuki et al.

(10) Patent No.: US 6,583,874 B1
(45) Date of Patent: Jun. 24, 2003

(54) SPECTROMETER WITH HOLOGRAPHIC AND ECHELLE GRATINGS

(75) Inventors: Toru Suzuki, Hiratsuka (JP); Osamu Wakabayashi, Hiratsuka (JP)

(73) Assignee: Komatsu, Ltd., Tokyo (JP)

( * ) Notice: Subject to any disclaimer, the term of this patent is extended or adjusted under 35 U.S.C. 154(b) by 330 days.

(21) Appl. No.: 09/680,932

(22) Filed: Oct. 10, 2000

(30) Foreign Application Priority Data

Oct. 18, 1999 (JP) ............................................ 11-295320
Feb. 28, 2000 (JP) ....................................... 2000-050574

(51) Int. Cl.⁷ ................................................. G01J 3/28
(52) U.S. Cl. ...................................... 356/328; 356/334
(58) Field of Search ................... 356/328, 73, 333–334

(56) References Cited

U.S. PATENT DOCUMENTS

| | | | | |
|---|---|---|---|---|
| 3,625,615 A | * | 12/1971 | Wilson | 356/331 |
| 3,730,626 A | * | 5/1973 | Cruvellier et al. | 356/333 |
| 4,371,263 A | * | 2/1983 | Witte | 356/333 |
| 4,490,021 A | * | 12/1984 | Moya | 359/572 |
| 4,553,840 A | * | 11/1985 | Nogami et al. | 356/333 |
| 5,363,220 A | * | 11/1994 | Kuwayama et al. | 359/3 |
| 5,565,983 A | * | 10/1996 | Barnard | 356/328 |
| 6,081,332 A | * | 6/2000 | Kojima | 356/334 |
| 6,151,112 A | * | 11/2000 | Atkinson et al. | 356/328 |

FOREIGN PATENT DOCUMENTS

| | | | | |
|---|---|---|---|---|
| JP | 11132848 | | 5/1999 | |
| WO | WO 93/16361 | * | 8/1993 | G01J/3/18 |

* cited by examiner

*Primary Examiner*—F. L. Evans
*Assistant Examiner*—Kara Geisel
(74) *Attorney, Agent, or Firm*—Stevens, Davis, Miller & Mosher, LLP

(57) ABSTRACT

A spectrometer has higher resolving power without enlarging a size of the apparatus. This spectrometer has a slit board, a mirror, a collimator lens, a holographic grating, an Echelle grating, a magnifier lens and a line sensor. The holographic grating is arranged to diffract parallel light incident from the collimator lens toward the Echelle grating. The Echelle grating is arranged to reflect the parallel light incident from the holographic grating toward the holographic grating.

13 Claims, 18 Drawing Sheets

SPECTROMETER WITH HOLOGRAPHIC AND ECHELLE GRATINGS

BACKGROUND OF THE INVENTION

1. Field of the Invention

The present invention relates to a spectrometer which is used to measure a spectrum of light supplied from a light source, in particular, a spectrometer having higher resolving power without enlarging a size of the apparatus.

2. Description of a Related Art

A spectrometer disclosed in Japanese patent application publication JP-A-11-132848 is known as a conventional optical apparatus which is used to measure a spectrum of light supplied from a light source. FIG. 31 shows a constitution of the spectrometer.

As shown in FIG. 31, spectrometer 200 has slit board 201, collimator lens 202, beam splitter 203, diffraction grating 204, mirror 205, magnifier lens 206, and line sensor 207.

In spectrometer 200, light supplied from a light source passes through slit board 201 and is changed into parallel light by collimator lens 202. The parallel light passes through beam splitter 203 and is incident into diffraction grating 204. The parallel light incident into diffraction grating 204 is diffracted toward beam splitter 203 as a first diffraction light (a single pass).

A part of the single pass is reflected by beam splitter 203 toward a direction shifted by a small angle from the optical axis of collimator lens 202. On the other hand, the rest of the single pass passes through beam splitter 203, collimator lens 202, mirror 205 and magnifier lens 206, and then focuses on a first range of channels of line sensor 207 to form a spectrum image.

The single pass reflected by beam splitter 203 is incident again into diffraction grating 204 and then diffracted toward beam splitter 203 as a second diffraction light (a double pass).

A part of the double pass is reflected by beam splitter 203 toward a direction shifted by a small angle from the optical axis of collimator lens 202. On the other hand, the rest of the double pass passes through beam splitter 203, collimator lens 202, mirror 205 and magnifier lens 206, and then focuses on a second range of channels of line sensor 207, which is different from the first range, to form a spectrum image.

Although the above-mentioned document disclose no concrete example of diffraction grating 204 for realizing a large diffraction angle as shown in FIG. 31, an Echelle grating is suitable for realizing such a large diffraction angle.

However, there are some problems in the case where the Echelle grating is used. That is, a number of groove lines or density of groove lines needs to be increased in order to make a diffraction grating which has a large diffraction angle and which can be used in a Littrow arrangement, however it is difficult to produce an Echelle grating having a large number of groove lines. On this account, diffraction light of a high diffraction order needs to be used in order to make the diffraction angle larger with a small number of groove lines. As a result, a difference between a wavelength of diffraction light of a certain diffraction order and a wavelength of diffraction light of the adjacent diffraction order, in other words, an FSR (free spectral range) becomes small.

Assuming that a wavelength of light incident into a diffraction grating is $\lambda 1$ and a diffraction order of the incident light is m1, and a wavelength of diffraction light is $\lambda 2$ and a diffraction order of the diffraction light is m2, every diffraction light is diffracted into the same direction when the following expression (1) is satisfied.

$$m1 \cdot \lambda 1 = m2 \cdot \lambda 2 \quad (1)$$

When expression (1) is satisfied, a wavelength difference $\Delta \lambda$ between a wavelength $\lambda 1$ and a wavelength $\lambda 2$, that is, an FSR is expressed by expression (2).

$$\Delta \lambda = \lambda 1/(m1+1) \quad (2)$$

By the way, if incident light is diffracted by using an Echelle grating and the diffraction order m1 is a very large number, for example, 100, every wavelength $\lambda 2$ satisfying $m1 \cdot \lambda 1 = m2 \cdot \lambda 2$ (m2: an integer) is observed at the same position as that of wavelength $\lambda 1$. For this reason, when plural spectrum lines exist in a wavelength range near to the wavelength $\lambda 1$, discrimination of those spectrum lines becomes difficult.

Concretely, for example, when light from an iron (Fe) hollow-cathode lamp is incident into an Echelle grating having a groove line number of 85.34 lines/mm, the diffraction angle of the 93rd order diffraction light having a wavelength $\lambda 1 = 248.3271$ nm of this lamp is different only by 0.018 degrees from the diffraction angle of the 55th order diffraction light having a wavelength $\mu 2 = 419.9098$ nm as shown in FIG. 32.

Thus, in a spectrometer in which the above-mentioned FSR is small, a difference of diffraction angles of diffraction lights of adjacent two diffraction orders is very small. In the case where the light source has plural emitting spectral lines as in the iron (Fe) hollow-cathode lamp, spectrums of respective diffraction lights are overlapped to each other and those spectrums can not be separated. As a result, it is difficult to identify the correspondence relation between the spectrums.

For example, even if a real spectrum having different wavelengths is distributed as shown in FIG. 33(a), the spectrum observed by the spectrometer having a small FSR has wavelengths as shown in FIG. 33(b) because a difference between diffraction angles of diffraction lights of diffraction orders adjacent to each other is very small in this spectrometer.

Further, in the spectrometer having a small FSR, there is a problem that a baseline portion of each spectrum can not be measured precisely because plural spectrums of distant orders are observed close to each other. As shown in FIG. 34, spectrum S1 exists in the neighborhood of spectrum S2 to be measured and a shape of spectrum S1 overlaps with a shape of spectrum S2 to be measured.

Although there are the above-mentioned problems when light having plural emission spectrum lines is incident into an Echelle grating, when light having only one emission spectrum line is incident into an Echelle grating, an output of the light can be detected.

In order to solve the above-mentioned problems, there is proposed the constitution as shown in FIG. 35 including a preliminary dispersion element, which makes plural emission spectrum lines into one emission spectrum line, before the light is incident into spectrometer 1 as disclosed in JP-A-11-132848. The preliminary dispersion element corresponds to means for making one line, in which prism 4 is arranged between two lenses 2 and 3.

This preliminary dispersion element makes the light that passed through lens 3 to be dispersed by prism 4 and then pass the dispersed light through lens 2 so that one-lined light is incident into slit 1a of spectrometer 1.

However, one prism alone can not completely remove the overlapped spectrum as mentioned above because the resolving power is not enough, that is to say, the performance for dividing neighboring spectrums is not enough. Therefore, it is considered to use plural prisms for improvement of the resolving power. However, There is a problem that the prism constitution becomes larger.

Besides, since the light passing through the prism generates some thermal change (temperature change), a refractive index of the prism also changes along with the temperature change. Accordingly, the light that passed through the prism at a position once fixed may become not to pass through slit 1a. In other words, the spectrum may become not to be measured.

Alternatively, preliminary spectrometer 5 as shown in FIG. 36 without using a prism may be used as means for making a single line. The preliminary spectrometer 5 is designed such that the light that passed through slit 6 is reflected by concave lens M1 into diffraction grating 7, the light diffracted by diffraction grating 7 is reflected by concave lens M2 and further reflected by reflecting mirror 8, thus the single-lined light is incident into conventional spectrometer 1 through slit 9.

Although spectrometer 1 is provided with sufficient resolving power in this manner, intensity of the single-lined light is decreased, and therefore, measurement of the light intensity by a photometer of spectrometer 1 becomes difficult.

Since the spectrometer as disclosed in JP-A-11-132848 is designed such that the light that passes through the part reflection mirror is diffracted by the diffraction grating, there occurs a problem that intensity of the light having a spectrum to be measured becomes weak and a S/N ratio becomes small when the light passes through the part reflection mirror. For example, if the light is diffracted three times by the diffraction grating, intensity of the diffracted light is decreased to only 0.55% of intensity of the incident light.

Furthermore, in the spectrometer as disclosed in JP-A-11-132848, a spectrum line not diffracted by the diffraction grating, a spectrum line diffracted once and a spectrum line diffracted twice are observed close to each other. Further, intensity of the light of less diffraction number of times is stronger. As a result, there is a problem that a baseline portion of once diffracted spectrum S1 overlaps with a baseline portion of twice diffracted spectrum S2 as shown in FIG. 34, thus a baseline portion of the spectrum of the desired light can not be measured precisely.

SUMMARY OF THE INVENTION

The present invention has been accomplished under the above-mentioned circumstances, and an object of the present invention is to provide a spectrometer which can realize higher resolving power without enlarging a size of an apparatus.

In order to solve the above-mentioned subjects, a spectrometer according to the first view of the present invention comprises detection means having plural light detection elements arranged in at least one direction; first diffraction means for diffracting incident light with a first diffraction order and outputting the diffracted light to the detection means, grooves being formed in the first diffraction means with such density that the detection means can detect the specified spectrum line; and second diffraction means for diffracting incident light with a second diffraction order higher than the first diffraction order and outputting the diffracted light to the first diffraction means, grooves being formed in the second diffraction means with less density than that in the first diffraction means.

Further, a spectrometer according to the second view of the present invention comprises detection means having plural light detection elements arranged in at least one direction; a collimating means for changing light supplied from a light source into parallel light; first diffraction means for diffracting the parallel light including a specified wavelength component into a predetermined direction; second diffraction means for diffracting the parallel light output from the first diffraction means into the first diffraction means so that the parallel light goes and returns a predetermined times between the first diffraction means and the second diffraction means; and focusing means for focusing the parallel light, which has gone and returned the predetermined times between the first diffraction means and the second diffraction means, on the detection means.

In the spectrometer according to the present invention having the first and second diffraction means, the specified wavelength component included in the light supplied from the light source is diffracted a predetermined times by each of the first and second diffraction means to obtain a spectrum image of the specified wavelength component.

On the other hand, in a conventional spectrometer having only one diffraction means, the specified wavelength component included in the light supplied from the light source is diffracted a predetermined times by this diffraction means to obtain a spectrum image of the specified wavelength component.

Due to such a difference, according to the present invention, the specified wavelength component included in the light supplied from the light source is diffracted more times than the conventional spectrometer. Therefore, an angle dispersion value larger than that in the conventional spectrometer can be obtained. That is to say, a smaller dispersion value can be obtained without lengthening a focal length of the collimating means. Accordingly, higher resolving power can be realized without enlarging a size of the apparatus.

In particular, in the case where the first diffraction means includes a holographic grating which diffracts the parallel light incident from collimating means with an outgoing angle of 0°, a beam width of the parallel light is magnified when it is diffracted by the holographic grating. Therefore, still higher resolving power can be obtained along with a still larger angle dispersion value.

DESCRIPTION OF THE PREFERRED EMBODIMENTS

Referring to accompanying drawings, embodiments of the present invention will be explained as follows.

The First Embodiment

Figure 1:
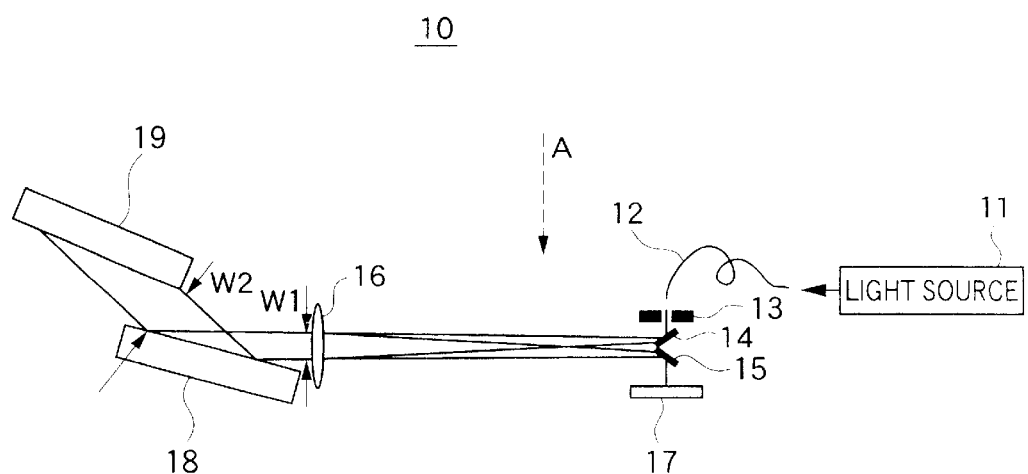
FIG. 1 is a diagram showing constitution of a spectrometer according to a first embodiment of the present invention.

FIG. 1 shows constitution of a spectrometer according to the first embodiment of the present invention.

As shown in FIG. 1, spectrometer 10 includes light source 11, optical fiber 12, slit board 13, two mirrors 14 and 15, collimator lens 16, sensor 17, the first diffraction grating 18 and the second diffraction grating 19.

Light source 11 emits light having plural emission spectrums of different wavelengths. As light source 11, any one of an iron (Fe) lamp, a mercury (Hg) lamp and a platinum (Pt) lamp can be used.

Slit board 13 is formed, for example, with a slit width of 25 $\mu$m and leads the light, which was emitted from light source 11 and passed through optical fiber 12, to mirror 14.

Mirror 14 reflects and leads the incident light from slit board 13 toward collimator lens 16 and mirror 15 reflects to lead the incident light, which passed through collimator lens 16, toward sensor 17.

Collimator lens 16 changes the incident light into collimated light, that is, parallel light and outputs it.

As sensor 17, a line sensor can be used. Specifically, sensor 17 can be constructed by using an image sensor of one or two dimension, or a photo diode array.

The line sensor has plural light receiving channels which are constructed by plural light detection elements and a light detection position of the line sensor is determined in accordance with a channel number that detected the maximum light intensity. A wavelength of the light can be detected from the light detection position of the line sensor, because an incident light position on the line sensor is varied in accordance with the wavelength of the light. Accordingly, the wavelength of the light is determined on the basis of the channel number that detected the light.

It should be noted that a wavelength (unit: nm) corresponding to a channel interval (unit: $\mu$m) of a line sensor is called as a dispersion value.

As first diffraction grating 18, a diffraction grating is used which has a large number of groove lines and can be used under a small diffraction order. Specifically, a holographic grating, an ion-etched grating, a blazed grating, an Echellete grating or a concave grating can be used as first diffraction grating 18.

In the embodiment, as first diffraction grating 18, a holographic grating having a groove line number of 3600 lines/mm is used. Hereinafter, the first diffraction grating will be referred as holographic grating 18.

A beam width W1 of an incident light beam into holographic grating 18 and a beam width W2 of an outgoing light beam from holographic grating 18 are presumed in the relation W1<W2, for example, a ratio W2/W1 is designed to be 9.86.

Second diffraction grating 19 is arranged to provide high diffraction effect in the Littrow arrangement in which an incident light direction and a diffracted light direction seem to be almost the same. Practically, an Echelle grating or a blazed grating can be used as second diffraction grating 19.

In this embodiment, an Echelle grating having a groove line number of 35.34 lines/mm is used as second diffraction grating 19. Hereinafter, the second diffraction grating will be referred as Echelle grating 19.

Figure 2:
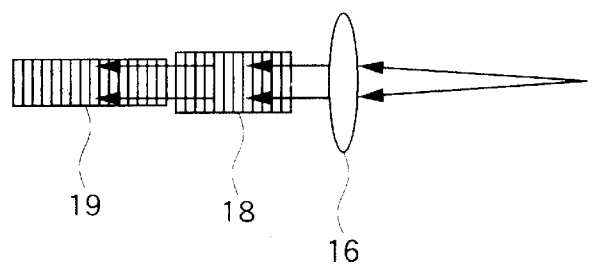
FIG. 2 is a diagram showing relative arrangement of a first diffraction grating and a second diffraction grating in the first embodiment of the present invention.

As shown in FIG. 2, holographic grating 18 and Echelle grating 19 are arranged in the position relation that groove lines of those diffraction gratings become spatially parallel to each other when spectrometer 10 is viewed from a direction as shown by an arrow A in FIG. 1.

The resolving power of a spectrometer becomes higher as the dispersion value of a line sensor becomes smaller. The dispersion value is a wavelength corresponding to a channel interval of the line sensor and defined by the following expression:

$$disp = sw/(f \cdot angDisp) \quad (3)$$

Where,
  disp: a dispersion value
  sw (=swd/mag): a one-to-one conversion size of a line sensor
  swd: a size of a line sensor
  mag: an expansion rate of a magnifier lens
  f: a focal length of a collimator lens
  angDisp: an angle dispersion value In a spectrometer, an angle dispersion value in the expression (3) is given by the following expressions:

$$angDisp1 = m/(d \cdot \cos \beta) \quad (4)$$

$$angDisp2 = 2m/(d \cdot \cos \beta) \quad (5)$$

Where,
  angDisp1: an angle dispersion value of a single pass
  angDisp2: an angle dispersion value of a double pass
  m: a diffraction order
  d: a groove line interval of a diffraction grating
  β: an outgoing angle from a diffraction grating As seen from the expression (3), a dispersion value can be made smaller at least either by enlarging an angle dispersion value or by lengthening a focal length of collimator lens 16.

Next, it will be explained why a diffraction grating which has a large groove line number and can be used in a small diffraction order, for example, a holographic grating is used for the first diffraction grating.

An Echelle grating is designed such that the diffraction efficiency becomes higher when an incident light angle and an outgoing light angle are almost the same angle (a blaze angle). The blaze angle needs to be made larger in order to make the angle dispersion value larger. In the present technology level, an Echelle grating having a blaze angle up to about 80° can be produced. However, it is very difficult to make the blaze angle larger than this angle.

Accordingly, as seen from the expressions (4) and (5), when an Echelle grating is used as first diffraction grating 18, it can not be expected to improve resolving power of a spectrometer by changing a angle dispersion value of the single pass or the double pass.

On the other hand, in order to make a dispersion value smaller, a focal length of collimator lens 16 may be changed longer. However, at least the space between slit board 13 and collimator lens 16 needs to be widened in order to lengthen a focal length of collimator lens 16. Whereby, the system scale would be enlarged while the focal length of collimator lens 16 is made longer to improve the resolving power of a spectrometer.

When the relation between the incident light having a wavelength λ1 with a diffraction order m1 incident into a diffraction grating and the diffraction light having a wavelength λ2 with a diffraction order m2 as expressed in the expression (1) is approved, a wavelength difference Δλ between the wavelength λ1 and the wavelength λ2 is expressed in the expression (2), that is, Δλ=λ1/(m1+1).

In order to diffract the incident light by using a diffraction grating having a large wavelength difference Δλ, that is, a large FSR, for example, a holographic grating is used.

In the case where holographic grating 18 is used under the condition that a diffraction order m1=1, the wavelength difference Δλ becomes λ1/2. For example, when a wavelength λ1=248 nm, a wavelength difference Δλ=124 nm is overlapped with a wavelength λ2=124 nm. However, the light having a wavelength λ2 is never output because it is absorbed in the air.

Figure 3:
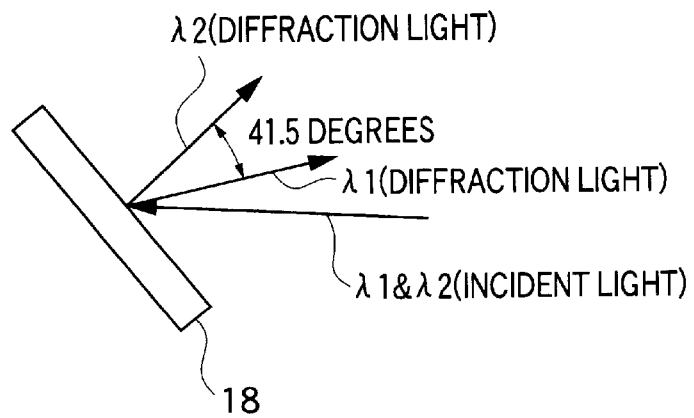
FIG. 3 is a diagram for explaining characteristic of a holographic grating.

When the light having a wavelength λ1=248.3271 nm and a wavelength λ2=419.9098 nm is diffracted by holographic grating 18 having a groove line number of 3600 lines/mm, as shown in FIG. 3, an angle difference of diffraction angles of two diffraction lights becomes 41.5 degrees. Therefore, light having a wavelength λ1 and light having a wavelength λ2 can be easily distinguished by sensor 17.

In the case of holographic grating 18, since an angle difference of diffraction angles of two diffraction lights is large as mentioned above, an FSR also becomes large as shown in FIG. 4. A spectrum corresponding to a wavelength L1 and a spectrum corresponding to a wavelength λ2 can be easily distinguished by collecting those lights on sensor 17 which measures wavelengths with a predetermined range.

Further, the light intensity that is output as a signal from sensor 17 can be represented as a product of diffraction efficiency of the first diffraction grating and diffraction efficiency of the second diffraction grating. For example, when diffraction efficiency of the first diffraction grating (holographic grating 18) is presumed as 30% and diffraction efficiency of the second diffraction grating (Echelle grating 19) is presumed as 50%, the intensity of the light output after being diffracted three times by those diffraction gratings and detected by sensor 17 becomes 30%×50%×30%=4.5% (relative intensity against intensity of the light incident into holographic grating 18).

Thus, in this embodiment, relative intensity of the light output after being diffracted three times by the diffraction gratings equals to 4.5%, which is about 10 times higher than relative intensity of 0.55% of the light output after being diffracted three times by diffraction gratings of a conventional spectrometer as disclosed in JP-A-11-132848.

Besides adopting the above-mentioned first and second diffraction gratings, one reason why spectrometer 10 obtains the light output which is about 10 times larger than that of the conventional spectrometer is that a part reflection mirror used in the conventional spectrometer is not used in spectrometer 10 so that loss (decrease of the light intensity) due to the part reflection mirror can be restrained.

Further, since the part reflection mirror is not used, intensity of the spectrum detected by sensor 17 depends on only the diffraction efficiency of the diffraction gratings. Accordingly, the light intensity can be measured with a high S/N ratio.

As mentioned above, a diffraction grating (for example, a holographic grating) which has a large number of groove lines and can be used under a low diffraction order, is adopted as the first diffraction grating in this embodiment because spectrums can be easily distinguished and intensity of the light having such spectrums can be obtained nearly 10 times strongly in comparison with the conventional spectrometer.

On the other hand, as mentioned above, if an Echelle grating is used as the first diffraction grating and a diffraction order m1=100, then every wavelength $\lambda 2$ which satisfies the relation $m1 \cdot \lambda 1 = m2 \cdot \lambda 2$ (m2: integer) is observed at the same position as that of the wavelength $\lambda 1$. Whereby, identification of plural spectrums becomes difficult if such plural spectrums could exist in a wavelength range near to the wavelength $\lambda 1$.

Figure 4:
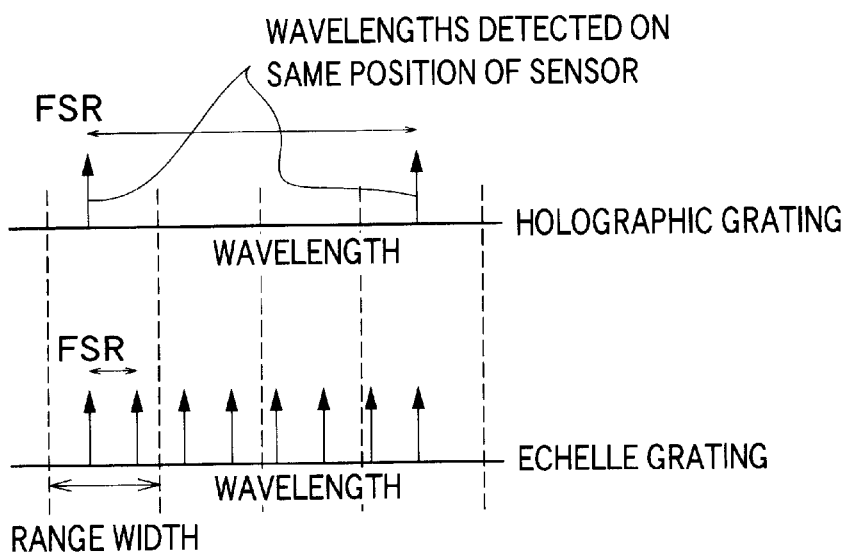
FIG. 4 is a diagram for explaining a relation between a number of groove lines of a diffraction grating and an FSR.

In the case of Echelle grating as shown in FIG. 4, since the FSR is small, plural spectrums of lights having an incident wavelength $\lambda 1$ under different diffraction orders come close to each other and the lights having plural wavelengths are measured within a predetermined range width in the sensor. Therefore, it becomes difficult to distinguish those spectrums.

Next, operation of spectrometer 10 having such constitution will be explained with referring to FIG. 1.

As shown in FIG. 1, the light emitted from light source 11 is led through optical fiber 12 to slit board 13 and then reflected by mirror 14.

The light reflected by mirror 14 is changed into parallel light by passing through collimator lens 16 and this parallel light is incident into holographic grating 18.

The incident parallel light is diffracted with a diffraction angle, which varies in accordance with a wavelength of the light, by holographic grating 18, then the diffracted light (first diffraction light) is incident into Echelle grating 19.

The first diffraction light is diffracted by Echelle grating 19 arranged in the Littrow arrangement and the diffracted light (second diffraction light) is incident again into holographic grating 18.

The second diffraction light is diffracted once again by holographic grating 18, and the diffracted light (third diffraction light) comes back to collimator lens 16 and reflected by mirror 15 to be collected on sensor 17.

Then, a spectrometer according to this embodiment will be explained in comparison with a conventional spectrometer of a Czerny-Turner type arrangement on the basis of concrete design examples.

At first, a spectrometer according to this embodiment will be explained.

As a light source, any one of an iron (Fe) lamp, a mercury (Hg) lamp and a platinum (Pt) lamp can be adopted.

Further, vacuum wavelengths of the iron (Fe) lamp are 248.4021 nm, 248.4935 nm and 248.8893 nm, vacuum wavelengths of the mercury (Hg) lamp are 248.275 nm, 248.347 nm and 248.457 nm and vacuum wavelengths of the platinum (Pt) lamp are 248.176 nm, 248.792 nm and 248.949 nm.

Design Example (a) Wavelength to be measured $\lambda$=248 nm
(b) The first diffraction grating
A holographic grating having a groove line number of 3600 lines/mm is used. The first order light (diffraction light of the first order) diffracted by the holographic grating is used.
(c) The second diffraction grating.
An Echelle grating having a groove line number of 85.34 lines/mm is used. The blaze angle is 78.7 degrees. The 93rd order light (diffraction light of the 93rd order) diffracted by the Echelle grating is used.
(d) Lens focal length=500 mm
(e) Slit width=25 $\mu$m
(f) Sensor channel (ch) width=25 $\mu$m
(g) A tilt angle of incident light into the holographic grating is 84.21 degrees.

Under the above-mentioned conditions, a wavelength per 1 ch of the sensor (a dispersion value) becomes 0.094 pm/ch. This means that plural spectrum lines can be indicated with high resolution power, besides, plural spectrums can be separated and a baseline portion of the spectrum can be measured precisely.

Further, ratio W2/W1 of an outgoing beam width W2 to an incident beam width W1 in the holographic grating becomes 9.86, whereby, the outgoing beam width turns out about 10 times wider in comparison with the incident beam width.

This means that an incident beam width into the holographic grating, which is arranged in a preceding stage of the Echelle grating, can be reduced. Accordingly, an effective area of the collimating optical element (for example, a collimator lens) which forms parallel light incident into the holographic grating can be made smaller so that the collimating optical element is miniaturized.

Next, a conventional spectrometer of a Czerny-Turner type arrangement, in which a holographic grating is used, will be explained.

(a) Type: Czerny-Turner type arrangement
(b) The first diffraction grating
A holographic grating having a groove line number of 3600 lines/mm is used. The first order light (diffraction light of the first order) diffracted by the holographic grating is used.
(c) Focal length of a concave mirror=1500 mm
(d) Slit width=25 $\mu$m
(e) Sensor channel (ch) width=25 $\mu$m
(f) A tilt angle of incident light into the holographic grating is 84.21 degrees.

Under the above-mentioned conditions, a wavelength per 1 ch of the sensor (a dispersion value) becomes 0.92 pm/ch. Although a size of the spectrometer is about three times longer (a focal length is three times longer) than that of a spectrometer according to this embodiment, the dispersion value can be realized with one-digit less.

In other words, even if the diffraction grating used in the conventional spectrometer is exchanged with the holographic grating same as this embodiment, a spectrometer with high resolving power can not be realized because the dispersion value is one-digit less while the size of the spectrometer becomes three times longer as mentioned above.

As explained above, according to this embodiment, the wavelength range is limited by the first diffraction grating, the light having the limited wavelength range is magnified with high resolving power by the second diffraction grating and the light magnified with high resolving power is returned to the first diffraction grating again to be diffracted. As a result, a spectrometer with high resolving power can be realized in which diffraction lights of different diffraction orders are not overlapped.

Further, relative intensity of the light detected by sensor 17 becomes 4.5%, which is a little less than 10 times in comparison with relative intensity of 0.55% of the light detected by a luminous intensity meter in the conventional spectrometer as disclosed in JP-A-11-132848.

Since a ratio W2/W1 of an outgoing beam width W2 to an incident beam width W1 is set to be 9.86 in the holographic grating, it is possible to reduce an effective diameter of the collimator lens to make the collimator lens small.

The Second Embodiment

Figure 5:
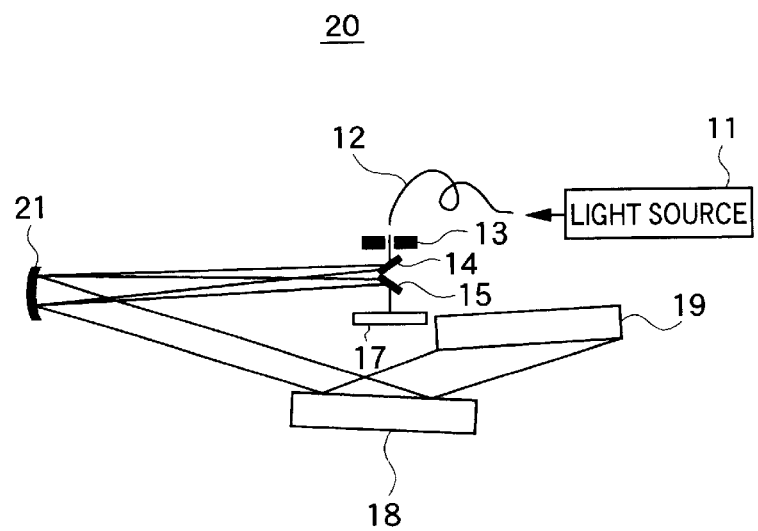
FIG. 5 is a diagram showing constitution of a spectrometer according to a second embodiment of the present invention.

FIG. 5 is a diagram showing constitution of a spectrometer according to the second embodiment of the present invention.

Spectrometer 20 as shown in FIG. 5 is constructed by adding concave mirror 21 instead of eliminating collimator lens 16 in the constitution of spectrometer 10 as shown in FIG. 1. In FIG. 5, the same reference numeral is given to the same construction element as shown in FIG. 1.

Next, operation of spectrometer 20 having the above-mentioned constitution will be explained with referring to FIG. 5.

As shown in FIG. 5, the light emitted from light source 11 is led through optical fiber 12 to slit board 13 and then reflected by mirror 14.

The light reflected by mirror 14 is further reflected by concave mirror 21 in parallel light form and is incident into holographic grating 18.

After that, as explained in the first embodiment, holographic grating 18 diffracts the parallel light reflected by concave mirror 21, and the diffracted light (the first diffraction light) is incident into Echelle grating 19.

The first diffraction light is diffracted by Echelle grating 19 and the diffracted light (the second diffraction light) is incident again into holographic grating 18. The second diffraction light is diffracted further (the third diffraction light) by holographic grating 18.

The third diffraction light after three times diffraction is reflected by concave mirror 21 and then reflected by mirror 15 to be collected on the sensor 17.

According to the second embodiment as explained above, chromatic aberration due to a lens does not occur by using concave mirror 21 instead of the lens, and therefore, light having any kind of wavelength can be measured.

The Third Embodiment

Figure 6:
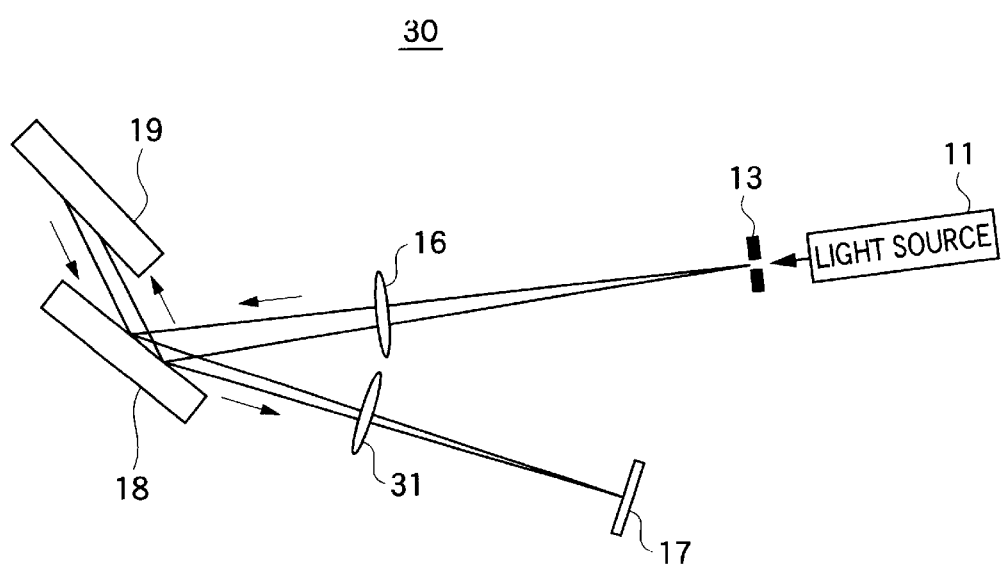
FIG. 6 is a diagram showing constitution of a spectrometer according to a third embodiment of the present invention.

FIG. 6 is a diagram showing constitution of a spectrometer according to the third embodiment of the present invention.

Spectrometer 30 as shown in FIG. 6 is constructed by adding lens 31 instead of eliminating optical fiber 12 and two mirrors 14 and 15 in constitution of spectrometer 10 as shown in FIG. 1. In FIG. 6, the same reference numeral is given to the same construction element as shown in FIG. 1.

Holographic grating 18 is arranged such that the parallel light passed through collimator lens 16 is incident into holographic grating 18 and outgoing light is output to lens 31 located in a direction different from a direction of the incident light.

It should be noted that a diffraction order of the first diffraction is set as "+1 order" and a diffraction order of the second diffraction is set as "+2 order" in holographic grating 18.

Next, operation of spectrometer 30 having the above-mentioned constitution will be explained with referring to FIG. 6.

As shown in FIG. 6, the light emitted from light source 11 passes through slit board 13 and collimator lens 16 to be incident into holographic grating 18 as parallel light.

The parallel light is diffracted by holographic grating 18 and the diffracted light, that is, diffraction light of "+1 order" diffraction (the first diffraction light) is incident into Echelle grating 19.

The first diffraction light is diffracted by Echelle grating 19 and the diffracted light (the second diffraction light) is incident into holographic grating 18.

The second diffraction light is diffracted by holographic grating 18, the diffracted light, that is, diffraction light of "+2 order" diffraction (the third diffraction light) passes through lens 31 and is collected on the sensor 17.

According to the third embodiment as explained above, since a diffraction order of the first diffraction is set as "+1 order" and a diffraction order of the second diffraction is set as "+2 order" in holographic grating 18, an incident light direction and an outgoing light direction are different from each other. Therefore, an image having less aberration can be focused on the sensor and a highly precise spectrum can be measured.

In the above-mentioned embodiment, a combination of "+1 order" diffraction and "+2 order" diffraction in holographic grating 18 has been explained. However, other arbitrary combination of orders may be possible, for example, a combination of "+1 order" diffraction and "−1 order" diffraction, or a combination of "+1 order" diffraction and "0 order" diffraction.

Although the dispersion value goes somewhat worse in the case where "0 order" diffraction is used, intensity of the output light (light detected by sensor 17) becomes larger in such constitution. Further, it becomes possible to measure a spectrum with higher precision by detecting the light of a high diffraction order such as "+2 order" and so on at sensor 17.

The Fourth Embodiment

Figure 7:
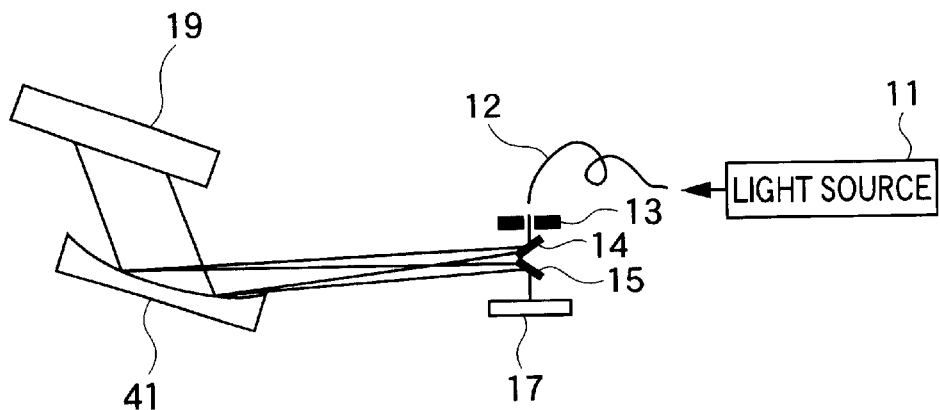
FIG. 7 is a diagram showing constitution of a spectrometer according to a fourth embodiment of the present invention.

FIG. 7 is a diagram showing constitution of a spectrometer according to the fourth embodiment of the present invention.

Spectrometer 40 as shown in FIG. 7 is constructed by adding concave grating 41 in place of holographic grating 18 and eliminating collimator lens 16 in the constitution of spectrometer 10 as shown in FIG. 1. In FIG. 7, the same reference numeral is given to the same construction element as shown in FIG. 1.

Next, operation of spectrometer 40 having the above-mentioned constitution will be explained with referring to FIG. 7.

As shown in FIG. 7, the light emitted from light source 11 is led through optical fiber 12 to slit board 13, diffracted by mirror 14 and is incident into concave grating 41.

The light incident into the concave grating 41 is diffracted with a diffraction angle, which varies in accordance with a wavelength of the light, and then the diffracted light (the first diffraction light) is incident into Echelle grating 19.

The first diffraction light is diffracted by Echelle grating 19 arranged in the Littrow arrangement and the diffracted light (the second diffraction light) is incident again into concave grating 41.

The second diffraction light is diffracted once again by concave grating 41, and the diffracted light (third diffraction light) is reflected by mirror 15 to be collected on sensor 17.

According to the fourth embodiment as explained above, a concave grating is used as the first diffraction grating so that one construction element achieves both a function of a lens and a function of a diffraction grating. Accordingly, a number of construction elements of a spectrometer can be reduced. Therefore, it becomes easy to adjust for detecting the light having a predetermined wavelength.

The Fifth Embodiment

Figure 8:
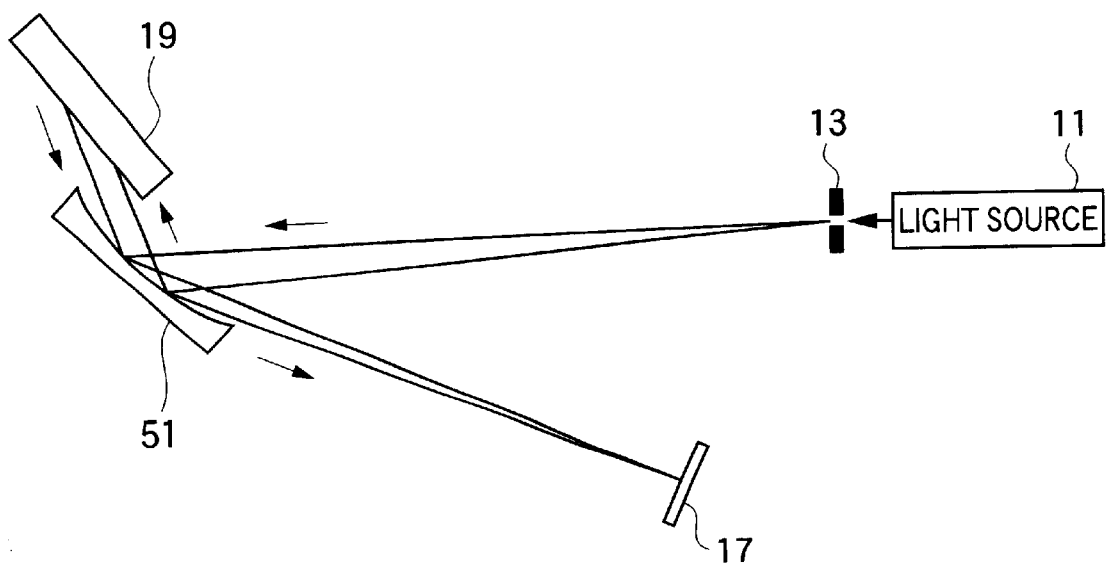
FIG. 8 is a diagram showing constitution of a spectrometer according to a fifth embodiment of the present invention.

FIG. 8 is a diagram showing constitution of a spectrometer according to the fifth embodiment of the present invention.

Spectrometer 50 as shown in FIG. 8 is constructed by adding concave grating 51 in place of holographic grating 18 and eliminating collimator lens 16 and lens 31 in the constitution of a spectrometer as shown in FIG. 6. In FIG. 8, the same reference numeral is given to the same construction element as shown in FIG. 6.

Concave grating 51 is arranged such that incident light output from slit board 13 is incident into concave grating 51 and outgoing light of concave grating 51 is output to sensor 17 located in a direction different from a direction of the incident light.

It should be noted that a diffraction order of the first diffraction is set as "+1 order" and a diffraction order of the second diffraction is set as "+2 order" in concave grating 51.

Next, operation of spectrometer 50 having the above-mentioned constitution will be explained with referring to FIG. 8.

As shown in FIG. 8, when the light from slit board 13 is incident into concave grating 51, the light is diffracted by concave grating 51 and the diffracted light, that is, diffraction light of "+1 order" diffraction (the first diffraction light) is incident into Echelle grating 19.

The first diffraction light is diffracted by Echelle grating 19 and the diffracted light (the second diffraction light) is incident into concave grating 51.

The second diffraction light is diffracted by concave grating 51 the diffracted light, that is, diffraction light of "+2 order" diffraction (the third diffraction light) is collected on sensor 17.

In the above-mentioned embodiment, a combination of "+1 order" diffraction and "+2 order" diffraction in concave grating 51 has been explained. However, other arbitrary combination of orders may be possible, for example, a combination of "+1 order" diffraction and "−1 order" diffraction, or a combination of "+1 order" diffraction and "0 order" diffraction.

According to the fifth embodiment as explained above, similar effect as in the above-mentioned third and fourth embodiments can be obtained.

The Sixth Embodiment

Figure 9:
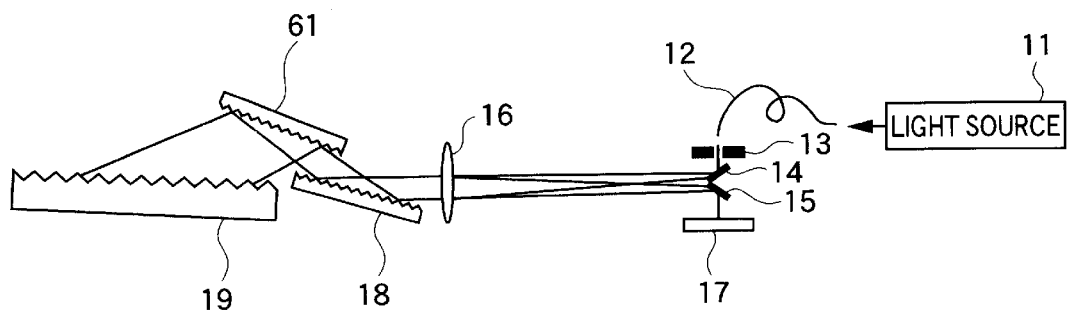
FIG. 9 is a diagram showing constitution of a spectrometer according to a sixth embodiment of the present invention.

FIG. 9 is a diagram showing constitution of a spectrometer according to the sixth embodiment of the present invention.

Spectrometer 60 as shown in FIG. 9 is constructed by adding a second holographic grating 61 in place of Echelle grating 19 in the constitution of a spectrometer as shown in FIG. 1 and arranging Echelle grating 19 at a different position. In FIG. 9, the same reference numeral is given to the same construction element as shown in FIG. 1.

In this embodiment, incident light into the holographic grating is diffracted four times and incident light into Echelle grating is diffracted once.

Next, operation of spectrometer 60 having such constitution will be explained with referring to FIG. 9.

As shown in FIG. 9, the parallel light incident into holographic grating 18 from collimator lens 16 is diffracted by holographic grating 18 with a diffraction angle, which varies in accordance with 20 a wavelength of the light, and the diffracted light (the first diffraction light) is incident into holographic grating 61.

The first diffraction light is diffracted by holographic grating 61 and the diffracted light (the second diffraction light) is incident into Echelle grating 19.

The second diffraction light is diffracted by Echelle grating 19 and the diffracted light (the third diffraction light) is incident again into holographic grating 61.

The third diffraction light is diffracted by holographic grating 61 (the fourth diffraction light), and further diffracted by holographic grating 18 (the fifth diffraction light).

The fifth diffraction light returns to collimator lens 16 and reflected by mirror 15 to be collected on sensor 17.

According to the sixth embodiment as explained above, the wavelength range is limited by the first and second holographic gratings 18 and 61, the light having the limited wavelength range is magnified with high resolving power by Echelle grating 19 and the light magnified with thigh resolving power is returned to the first and second holographic gratings 18 and 61 to be diffracted. Therefore, a spectrometer having high resolving power can be realized in which diffraction lights having different diffraction orders are not overlapped.

The Seventh Embodiment

Figure 10:
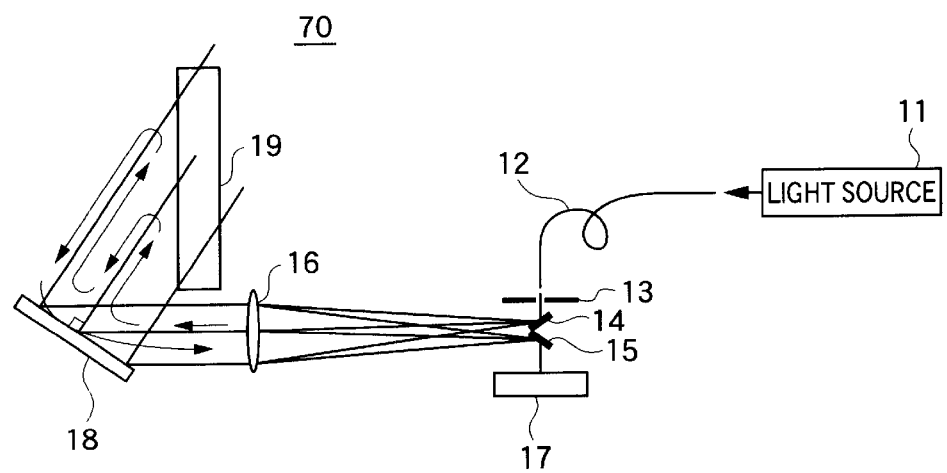
FIG. 10 is a diagram showing constitution of a spectrometer according to a seventh embodiment of the present invention.

FIG. 10 is a diagram showing constitution of a spectrometer according to the seventh embodiment of the present invention.

Spectrometer 70 as shown in FIG. 10 is constructed by changing arrangement of holographic grating 18 and Echelle grating 19 in the constitution of a spectrometer as shown in FIG. 1. In FIG. 10, the same reference numeral is given to the same construction element as shown in FIG. 1.

A setting angle of holographic grating 18 is adjusted such that a diffracted angle of the light diffracted by holographic grating 18 (the first diffraction light) becomes zero degree, in other words, the diffracted angle agrees with a normal direction of holographic grating 18.

The first diffraction light is incident into Echelle grating 19. The first diffraction light is diffracted by Echelle grating 19 and the diffracted light (the second diffraction light) is incident again into holographic grating 18.

In the case of this arrangement, an incident angle of the second diffraction light against holographic grating 18 is zero degree, and therefore, the light directly reflected by holographic grating 18 like a mirror (the first reflection light) is incident again into Echelle grating 19.

The first reflection light is diffracted by Echelle grating 19 and the diffracted light (the third diffraction light) is incident again into holographic grating 18. The third diffraction light is diffracted by holographic grating 18 and the diffracted light (the fourth diffraction light) is incident into collimator lens 16 and reflected by mirror 15 to be detected on sensor 17.

In this case, the second diffraction light is directly reflected by holographic grating 18 while the third diffraction light is diffracted by holographic grating 18 to be the fourth diffraction light, which is incident into collimator lens 16 and reflected by mirror 15 to be detected by sensor 17.

In order to separate the second diffraction light forwarding to Echelle grating 19 from the fourth diffraction light forwarding to sensor 17, a setting angle of Echelle grating 19 is slightly shifted from the Littrow arrangement so that the second diffraction light and the fourth diffraction light can be focused on different positions of sensor 17.

According to the seventh embodiment as explained above, since the light is diffracted two times by Echelle grating 19 and diffracted two times by holographic grating 18, a spectrometer having higher resolving power (higher dispersion) than that of the first embodiment can be realized.

The Eighth Embodiment

Next, the eighth embodiment of the present invention will be explained with referring from FIGS. 11–18.

Figure 11:
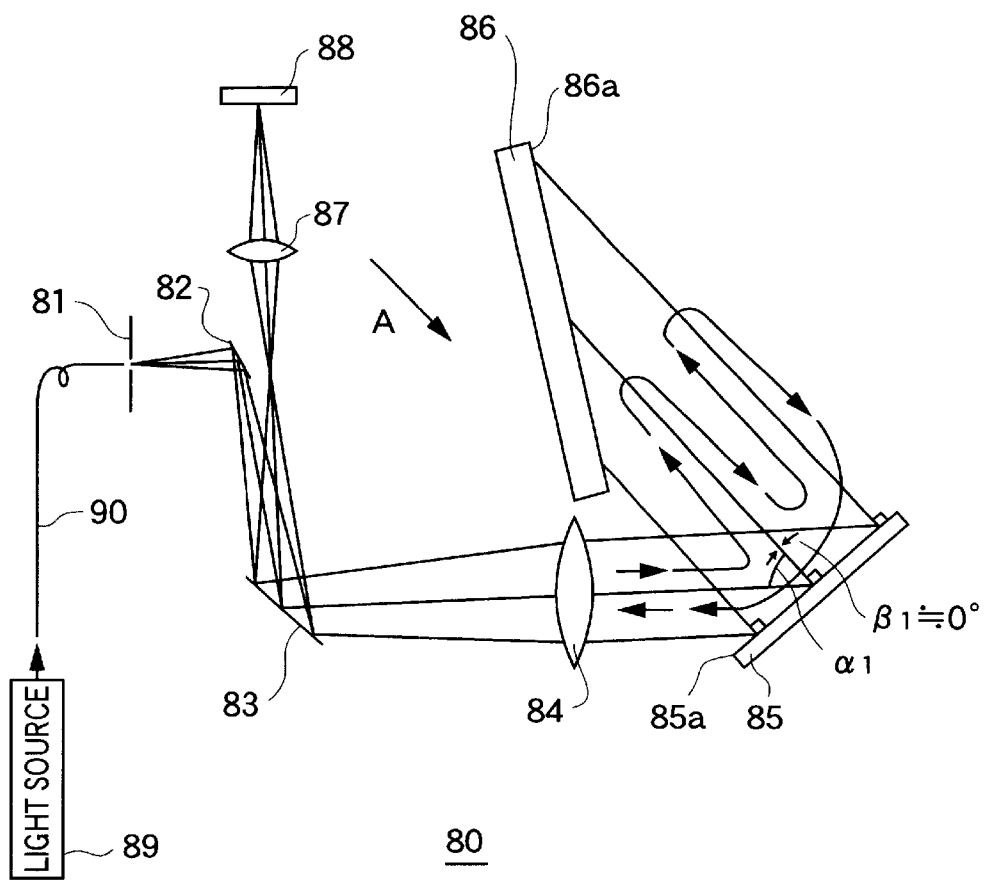
FIG. 11 is a side view showing constitution of a spectrometer according to a eighth embodiment of the present invention.

As shown in FIG. 11, spectrometer 80 is an optical apparatus for measuring a spectrum of excimer laser light supplied through optical fiber 90 from light source 89 (for example, a wavelength $\lambda$=248.3 nm). Spectrometer 80 includes slit board 81, mirrors 82 and 83, collimator lens 84, holographic grating 85, Echelle grating 86, magnifier lens 87 and line sensor 88.

A part of excimer laser light supplied through optical fiber 90 from light source 89 passes through slit board 81. The excimer laser light that passed through the slit board 81 is incident into collimator lens 84 through mirrors 82 and 83. A size of mirror 83 is designed to be larger than that of mirror 82.

Collimator lens 84 is a kind of optical element for collimating light. The excimer laser light that passed through mirrors 82 and 83 is changed into parallel light by collimator lens 84. Parallel light outgoing from collimator lens 84 is incident into holographic grating 85.

Holographic grating 85 is a kind of dispersion optical elements having a large number of groove lines and suitable for obtaining diffraction light of a low diffraction order. On surface 85a of holographic grating 85, there are formed a lot of groove lines which extends in a right angle against the paper. Holographic grating 85 is arranged to diffract the parallel light incident from collimator lens 84 toward Echelle grating 86 under a predetermined diffraction order (for example, a diffraction order m1=1). As to relation between an incident light angle and an outgoing light angle in the holographic grating, an angle direction in which parallel light is incident is defined as positive thereinafter.

In detail, holographic grating 85 is arranged to diffract parallel light incident with an incident angle $\alpha_1$ and an outgoing angle $\beta_1$=0°. Owing to holographic grating 15, a beam width of the parallel light can be magnified more than that before diffraction. A diffraction expression in holographic grating 85 is given as follows:

$$m1 \cdot \lambda = d_1(\sin \alpha_1 + \sin \beta_1(=0)) \quad (6)$$

Where, $d_1$ represents an interval of groove lines of holographic grating 85 and $\lambda$ represents a wavelength of incident light.

Figure 12:
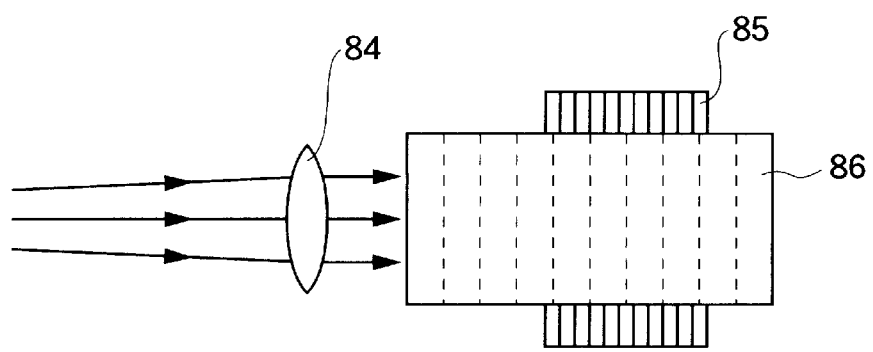
FIG. 12 is a plan view showing a part of the spectrometer as shown in FIG. 11.

Echelle grating 86 is a kind of dispersion optical element suitable for obtaining diffraction light with a large outgoing angle. On surface 86a of Echelle grating 86, there are formed a lot of groove lines which extends in a right angle against the paper. However, Echelle grating 86 has fewer groove lines (lower density) than that of holographic grating 85. Groove lines of holographic grating 85 and groove lines of Echelle grating 86 are arranged to be in parallel spatially as shown in FIG. 12 when spectrometer 80 is viewed from a direction of an arrow A as shown in FIG. 11.

Echelle grating 86 is arranged to diffract the parallel light incident from holographic grating 85 toward holographic grating 85 under a predetermined diffraction order (for example, a diffraction order m2=84). A diffraction expression in holographic grating 86 is given as follows:

$$m2 \cdot \lambda = d2(\sin \alpha_2 + \sin \beta_2) \quad (7)$$

Where, $d_2$ represents an interval of groove lines of Echelle grating 86, and as to relation between an incident angle $\alpha_2$ and an outgoing angle $\beta_2$ in Echelle grating 86, an angle direction in which parallel light is incident is defined as positive.

Then, arrangement of Echelle grating 86 is explained with referring to FIGS. 13–17.

Figure 13:
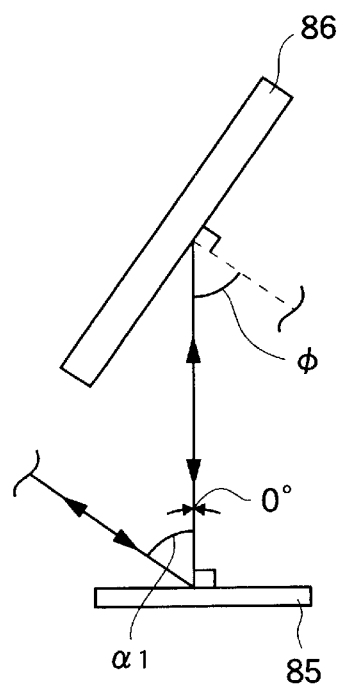
FIGS. 13–17 are diagrams for explaining setting arrangements of an Echelle grating.

FIG. 13 shows the case where Echelle grating 86 is arranged in the Littrow arrangement (an arrangement in which an incident angle=an outgoing angle=$\phi$). In this case, parallel light outgoing from holographic grating 85 with an outgoing angle of 0° is incident into Echelle grating 86 with an incident angle $\phi$ and diffracted with an outgoing angle $\phi$.

On this account, a part of the parallel light output from Echelle grating 86 with an outgoing angle $\phi$ is diffracted by holographic grating 85 with an outgoing angle $\alpha_1$ to make a single pass, while another part of the parallel light is directly reflected from holographic grating 85 with an outgoing angle of 0°. Accordingly, in FIG. 11, the single pass never reaches line sensor 88 and it is impossible to obtain any spectrum image of the excimer laser emitted from light source 89.

Figure 14:
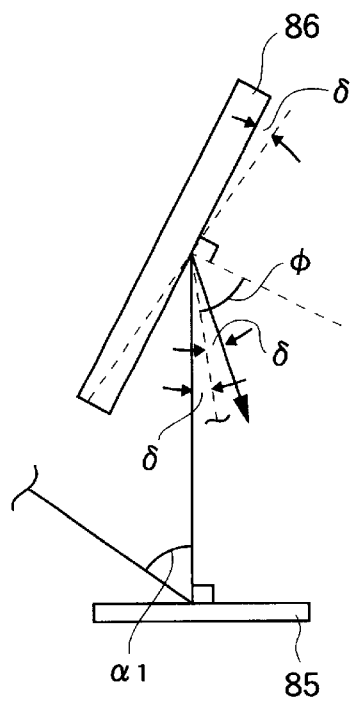

FIG. 14 shows an arrangement in which Echelle grating 86 is rotated by a slight angle $\delta$ (for example, $\delta \leq 5°$) from the Littrow arrangement in a counterclockwise direction. In this case, the parallel light outgoing from holographic grating 85 with an outgoing angle of 0° is incident into Echelle grating 86 with an incident angle ($\phi+\delta$) and diffracted with an outgoing angle ($\phi-\delta$).

Figure 15:
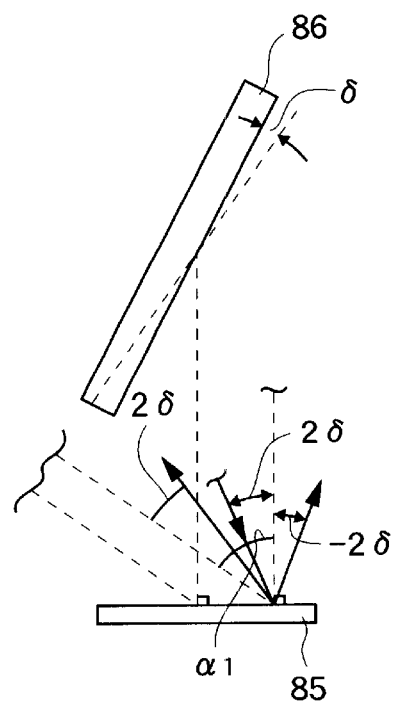

As shown in FIG. 15, the parallel light outgoing from Echelle grating 86 with an outgoing angle ($\phi-\delta$) is incident into holographic grating 85 with an incident angle 2$\delta$. Therefore, a part of parallel light obtained by this incident process is diffracted by holographic grating 85 with an outgoing angle ($\alpha_1 - 2\delta/\cos \alpha_1$), that is, an angle smaller by $2\delta/\cos \alpha_1$ than that in the Littrow arrangement to make a single pass while another part of the parallel light is directly reflected by holographic grating 85 with an outgoing angle ($-2\delta$).

Figure 16:
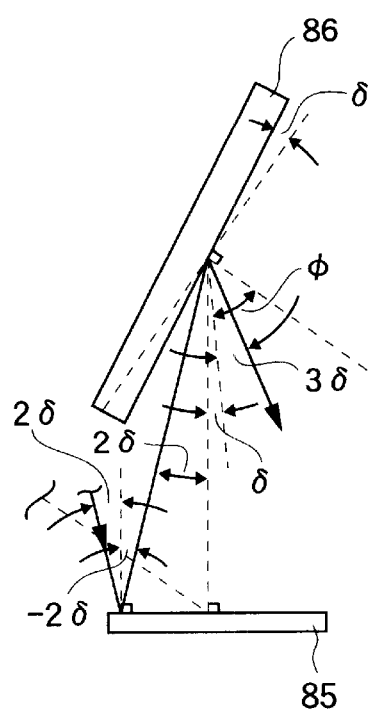

Meanwhile, as shown in FIG. 16, the parallel light outgoing from holographic grating 85 with an outgoing angle ($-2\delta$) is incident into Echelle grating 86 with an incident angle ($\phi+3\delta$) and diffracted with an outgoing angle ($\phi-3\delta$).

Figure 17:
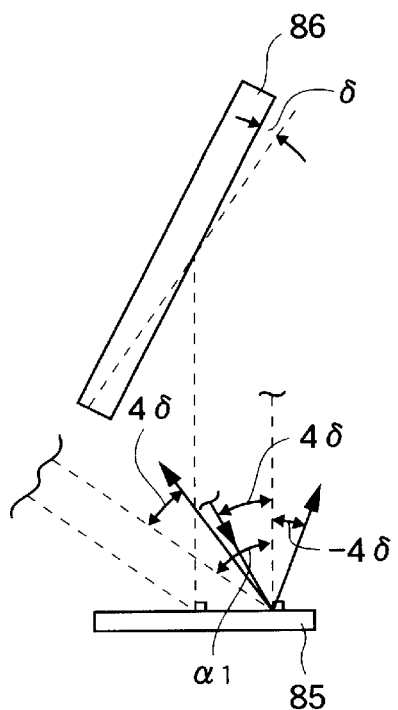

As shown in FIG. 17, the parallel light outgoing from Echelle grating 86 with an outgoing angle ($\phi-3\delta$) is incident into holographic grating 85 with an incident angle 4$\delta$. Therefore, a part of the parallel light obtained by this incident process is diffracted by holographic grating 85 with an outgoing angle ($\alpha_1 - 4\delta/\cos \alpha_1$) to make a double pass while another part of the parallel light is directly reflected from holographic grating 85 with an outgoing angle ($-4\delta$).

On this account, as shown in FIG. 11, when a light path reaching line sensor 88 and an optical axis of collimator lens 84 cross each other with angle $\theta$, the single pass can reach line sensor 88 by rotating Echelle grating 86 by an angle $\delta=(\theta/2)\cos \alpha_1$ from the Littrow arrangement in a counterclockwise direction. On the other hand, when Echelle grating 86 is rotated by an angle $\delta=(\theta/4)\cos \alpha_1$ from the Littrow arrangement in a counterclockwise direction, the double pass can reach line sensor 88. In similar consideration, when Echelle grating 86 is rotated by angle $\delta=(\theta/6)\cos \alpha_1$ from the Littrow arrangement in a counterclockwise direction, the triple pass can reach line sensor 88.

This angle θ has a value that can be ignored in comparison with an angle $\alpha_1$ or $\beta_1$. Accordingly, by considering expressions (6) and (7), an expression for obtaining an angle dispersion value when the single pass is detected is given as follows:

$$angDisp1 = X_1 + X_2 + X_3 \tag{8}$$

$$X_1 = m_1/(d_1 \cdot \cos \alpha_1) \tag{9}$$

$$X_2 = (m_2 \cdot \cos \beta_1)/(d_2 \cdot \cos \alpha_1 \cdot \cos \beta_2) \tag{10}$$

$$X_3 = (m_1 \cdot \cos \beta_1 \cdot \cos \alpha_2)/(d_1 \cdot \cos \beta_1 \cdot \cos \beta_2 \cdot \cos \alpha_1) \tag{11}$$

And an expression for obtaining an angle dispersion value when the double pass is detected is given as follows:

$$angDisp2 = Y_1 + Y_2 + Y_3 \tag{12}$$

$$Y_1 = m_1/(d_1 \cdot \cos \alpha_1) \tag{13}$$

$$Y_2 = (2m_2 \cdot \cos \beta_1)/(d_2 \cdot \cos \alpha_1 \cdot \cos \beta_2) \tag{14}$$

$$Y_3 = (m_1 \cdot \cos \beta_1 \cdot \cos \alpha_2)/(d_1 \cdot \cos \beta_1 \cdot \cos \beta_2 \cdot \cos \alpha_1) \tag{15}$$

Further, an expression for obtaining an angle dispersion value when the triple pass is detected is given as follows:

$$angDisp3 = Z_1 + Z_2 + Z_3 \tag{16}$$

$$Z_1 = m_1/(d_1 \cdot \cos \alpha_1) \tag{17}$$

$$Z_2 = (3m_2 \cdot \cos \beta_1)/(d_2 \cdot \cos \alpha_1 \cdot \cos \beta_2) \tag{18}$$

$$Z_3 = (m_1 \cdot \cos \beta_1 \cdot \cos \alpha_2)/(d_1 \cdot \cos \beta_1 \cdot \cos \beta_2 \cdot \cos \alpha_1) \tag{19}$$

Figure 18:
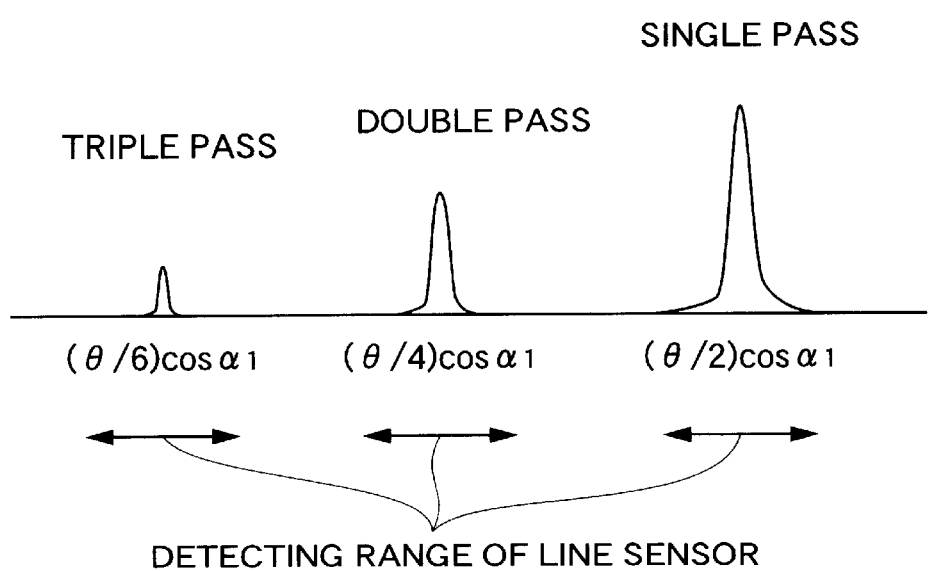
FIG. 18 is a diagram showing spectrums of a single pass, a double pass and a triple pass provided by the spectrometer as shown in FIG. 11.

FIG. 18 shows relation between the rotation angle δ of Echelle grating 86 from the Littrow arrangement in a counterclockwise direction and provided spectrums of the single pass, the double pass and the triple pass. Since a number of times of the diffraction is increased in accordance with the single pass, the double pass and the triple pass in this order, the resolving power also gets higher in this order. On the other hand, as shown in FIG. 18, energy loss is increased and light intensity gets lower in accordance with the single pass, the double pass and the triple pass in this order.

Therefore, in this embodiment, Echelle grating 86 is rotated by an angle $\delta=(\theta/4)\cos \alpha_1$ from the Littrow arrangement in a counterclockwise direction so that the double pass having relatively high intensity and resolving power can reach line sensor 88. In the case where line sensor 88 has enough performance to deal with intensity of the triple pass, the triple pass may be detected by rotating Echelle grating 86 by an angle $\delta=(\theta/6)\cos \alpha_1$ from the Littrow arrangement in a counterclockwise direction.

Referring to FIG. 11 again, line sensor 88 includes plural light detection elements arranged on one straight line and is constructed by a one-dimension image sensor, a photo diode array or the like. Each channel of line sensor 88 outputs a response according to the intensity of the received light. Thus, a spectrum image of excimer laser light emitted from light source 89 can be obtained on the basis of the response output from each channel. Alternatively, sensors may be arranged in two-dimension so as to add outputs of plural light detection elements arranged in plural lines together for each row.

Figure 31:
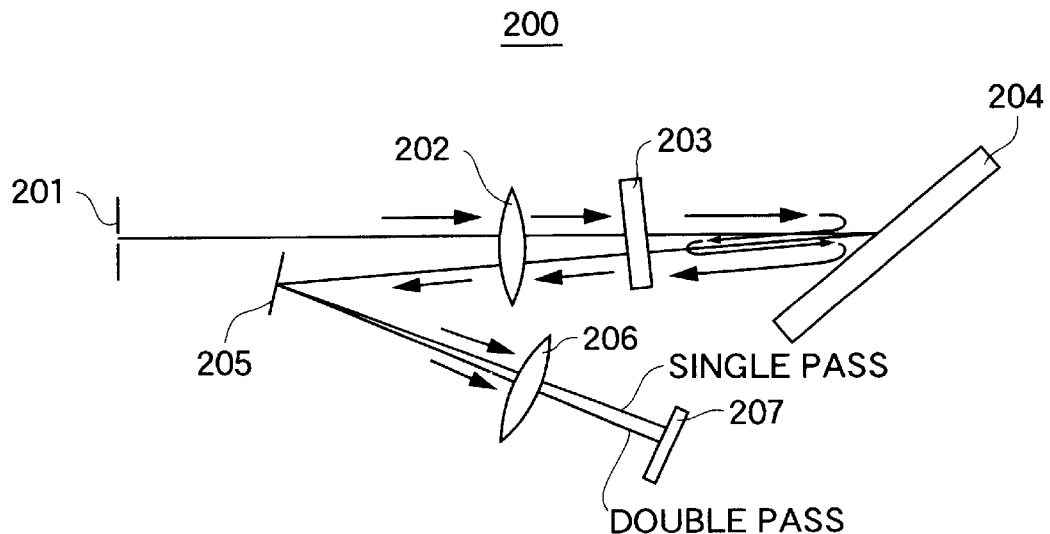
FIG. 31 is a diagram showing constitution of a conventional spectrometer.
Figure 32:
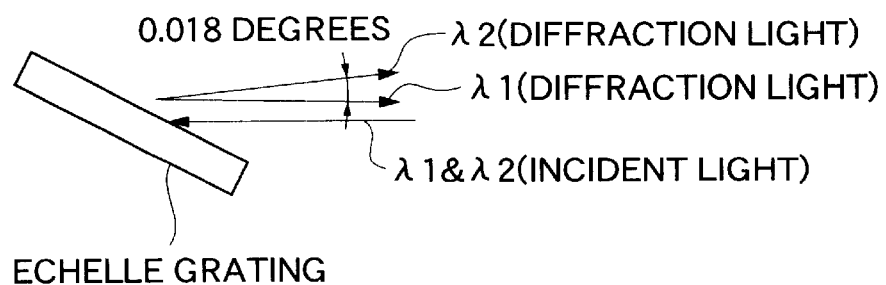
FIG. 32 is a diagram for explaining a characteristic of an Echelle grating.
Figure 33:
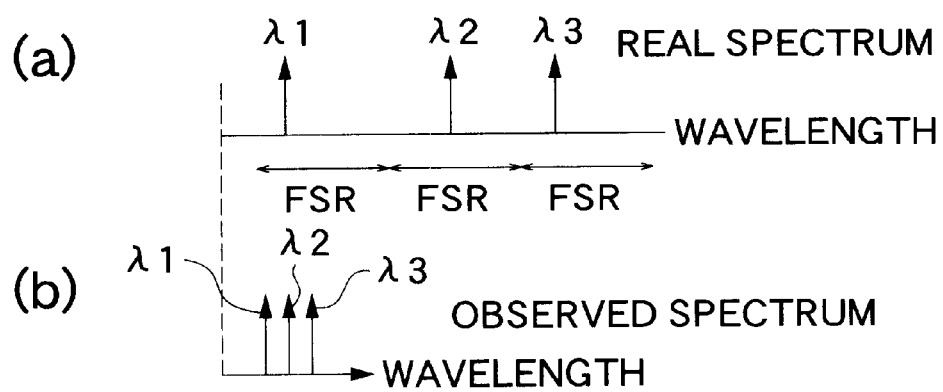
FIG. 33 is a diagram for explaining relation between a real spectrum and a spectrum observed by a spectrometer having a small FSR.
Figure 34:
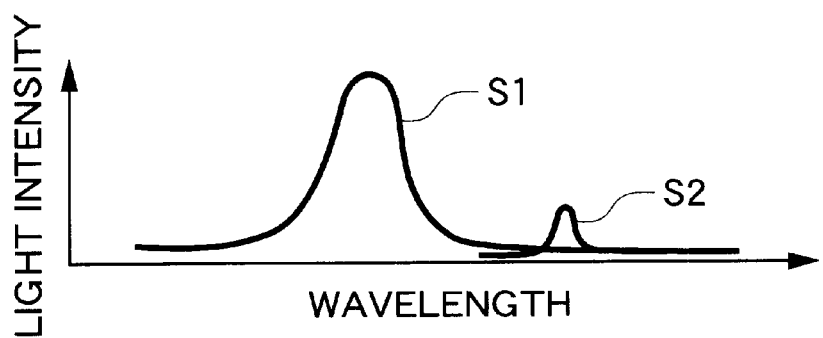
FIG. 34 is a diagram showing the state in which two spectrums are overlapped.
Figure 35:
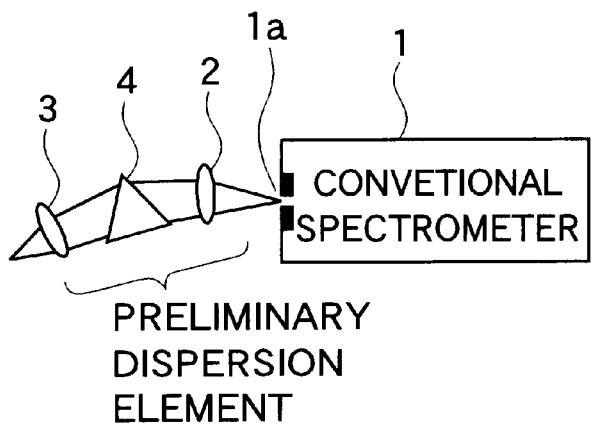
FIG. 35 is a diagram showing an example of a spectrometer in which a preliminary dispersion element for making a single line is added to conventional spectrometer.
Figure 36:
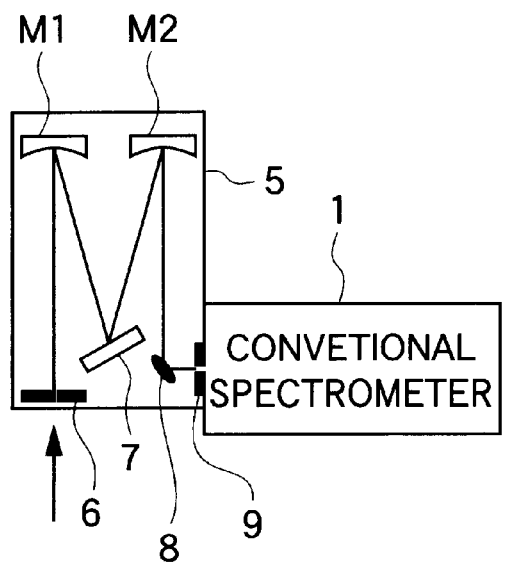
FIG. 36 is a diagram showing an example of a spectrometer in which a preliminary spectrometer for making a single line is added to conventional spectrometer.

Next, a concrete dispersion value for spectrometer 80 will be explained in comparison with conventional spectrometer 200 (see FIG. 31).

Specification values in spectrometer 80 are set as follows:
Wavelength of excimer laser light: λ=248.3 nm
Focal length of collimator lens: f=1500 mm
Holographic grating
Groove interval: $d_1=1/3600$ mm
Diffraction order: $m_1=1$
Incident angle: $\alpha_1=63.4°$
Outgoing angle: $\beta_1=0°$
Echelle grating
Groove interval: $d_2=1/94.13$ mm
Diffraction order: $m_2=84$
Incident angle: $\alpha_2=79.0°$
Outgoing angle: $\beta_2=79.0°$
Line sensor size: swd=24 μm
Magnifier lens expansion rate: mag=5

On the basis of expressions (3) and (8) to (11), a single pass dispersion value disp1 is given as follows:

$$disp1 = 0.029 \text{ pm/ch} \tag{20}$$

Further, on the basis of expressions (3) and (12) to (15), a double pass dispersion value disp2 is given as follows:

$$disp2 = 0.016 \text{ pm/ch} \tag{21}$$

As well, on the basis of expressions (3) and (16) to (19), a triple pass dispersion value disp3 is given as follows:

$$disp3 = 0.011 \text{ pm/ch} \tag{22}$$

On the other hand, Specification values in conventional spectrometer 200 are set as follows:
Wavelength of excimer laser light: λ=248.3 nm
Focal length of collimator lens: f=1500 mm
Echelle grating
Groove interval: d=1/94.13 mm
Diffraction order: m=84
Incident angle: α=79.0°
Outgoing angle: β=79.0°
Line sensor size: swd=24 μm
Magnifier lens expansion rate: mag=5

On the basis of expressions (3) to (5), a single pass dispersion value disp1 and a double pass dispersion value disp2 are given as follows:

$$disp1 = 0.077 \text{ pm/ch} \tag{23}$$

$$disp2 = 0.039 \text{ pm/ch} \tag{24}$$

By comparing numerical values (20) with (23) and (21) with (24) dispersion values in this embodiment are smaller than those in the conventional spectrometer. The reason why the dispersion values can be reduced is supposed as follows:

(a) Since light is diffracted by the holographic grating in addition to the Echelle grating, an angle dispersion value is enlarged in comparison with the conventional spectrometer even if a diffraction number of Echelle grating is the same as that of the conventional spectrometer.

(b) The holographic grating is arranged to output the parallel light incident from the collimator lens with an outgoing angle of 0°. Therefore, a beam width of the parallel light can be magnified when the parallel light is diffracted by the holographic grating.

According to this embodiment, higher resolving power can be realized without enlarging a size of the apparatus.

The Ninth Embodiment

Figure 19:
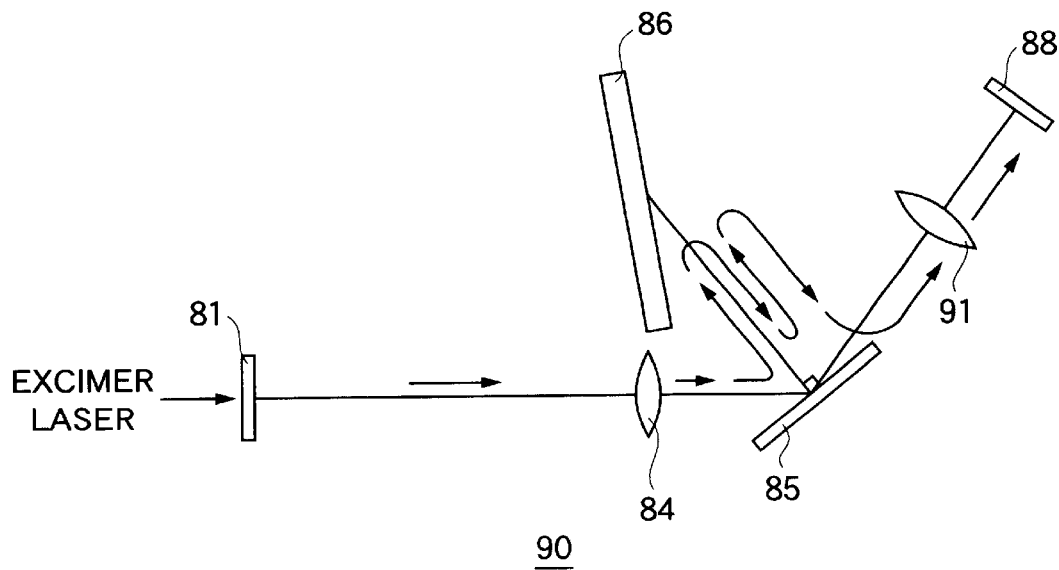
FIG. 19 is a diagram showing constitution of a spectrometer according to a ninth embodiment of the present invention.

Next, the ninth embodiment of the present invention will be explained with referring to FIG. 19. The same reference numeral is given to the common construction element to the eighth embodiment and explanation about the common element will be omitted.

Spectrometer 90 according to the present embodiment is constructed by adding lens 91 instead of eliminating mirrors 82 and 83 and magnifier lens 87 in the constitution of spectrometer 80 as shown in FIG. 11. In spectrometer 90, slit board 81 and collimator lens 84 are arranged in one straight line. Parallel light output from collimator lens 84 is incident into holographic grating 85.

Holographic grating 85 is arranged to diffract parallel light incident from collimator lens 84 with an outgoing angle of 0° so that the diffracted parallel light goes and returns two times between holographic grating 85 and Echelle grating 86 and to diffract the parallel light obtained by the twice round trips with a negative outgoing angle. On this account, the double pass obtained in the same manner as the first embodiment is output from holographic grating 85 with the negative outgoing angle.

Lens 91 is arranged on a light path having a negative angle from holographic grating 85. The double pass output from holographic grating 85 transmits along an optical axis of lens 91.

The most remarkable characteristic of spectrometer 90 is to make output light of the double pass to transmit along the optical axis of lens 91 and to focus on the channel of line sensor 88. On this account, influence of aberration of the lens system can be suppressed according to this embodiment, the same effect as the eighth embodiment can be achieved, and also, a decline of the resolving power due to the influence of aberration of the lens system can be prevented.

The 10th Embodiment

Figure 20:
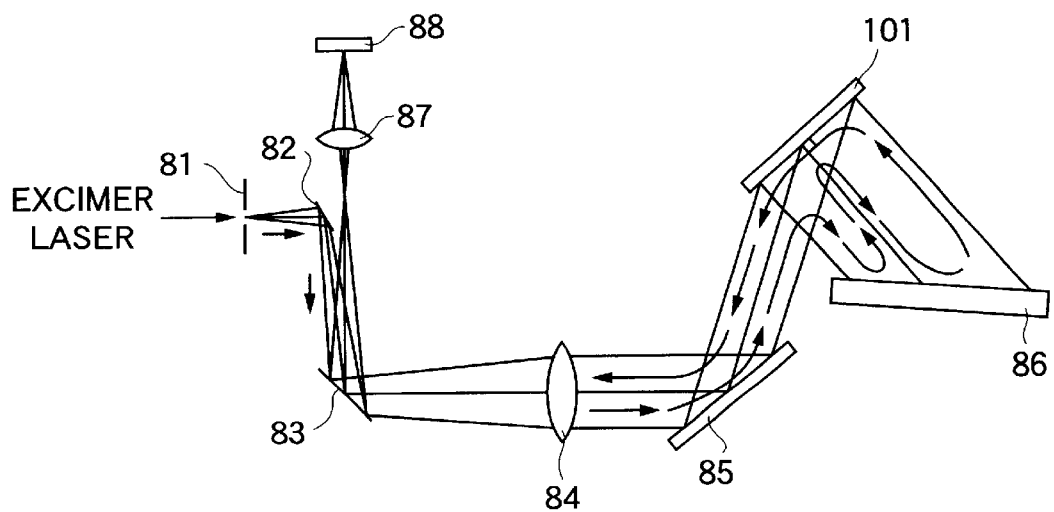
FIG. 20 is a diagram showing constitution of a spectrometer according to a 10th embodiment of the present invention.

Next, the 10th embodiment of the present invention will be explained with referring to FIG. 20. Spectrometer 100 according the resent embodiment is constructed by adding holographic grating 101 to the constitution of spectrometer 80 as shown in FIG. 8.

Holographic grating 85 is arranged to diffract the parallel light incident from collimator lens 84 with a negative outgoing angle. Holographic grating 101 is arranged to diffract the parallel light incident from holographic grating 85 with an outgoing angle of 0° and to diffract the parallel light, which has gone and returned two times between holographic grating 101 and Echelle grating 86, toward holographic grating 85.

Echelle grating 86 is arranged such that the parallel light goes and returns two times between holographic grating 101 and Echelle grating 86. That is to say, Echelle grating 86 is adjusted in an arrangement, which is almost regarded as the Littrow arrangement, against the parallel light incident from holographic grating 101.

The most remarkable characteristic of spectrometer 100 is that the parallel light is diffracted more times than spectrometer 80 according to the eighth embodiment. In the present embodiment, a number of times of diffraction is larger than that in spectrometer 80 by a number of times of diffraction owing to holographic grating 101. According to this embodiment, the dispersion value can be made smaller than that of the eighth embodiment and the resolving power can be realized even higher.

The 11th Embodiment

Next, the 11th embodiment of the present invention will be explained with referring to FIGS. 21 and 22. Spectrometer 110 according to the present embodiment is constructed by eliminating lens 91 in the constitution of spectrometer 90 as shown in FIG. 19.

Figure 21:
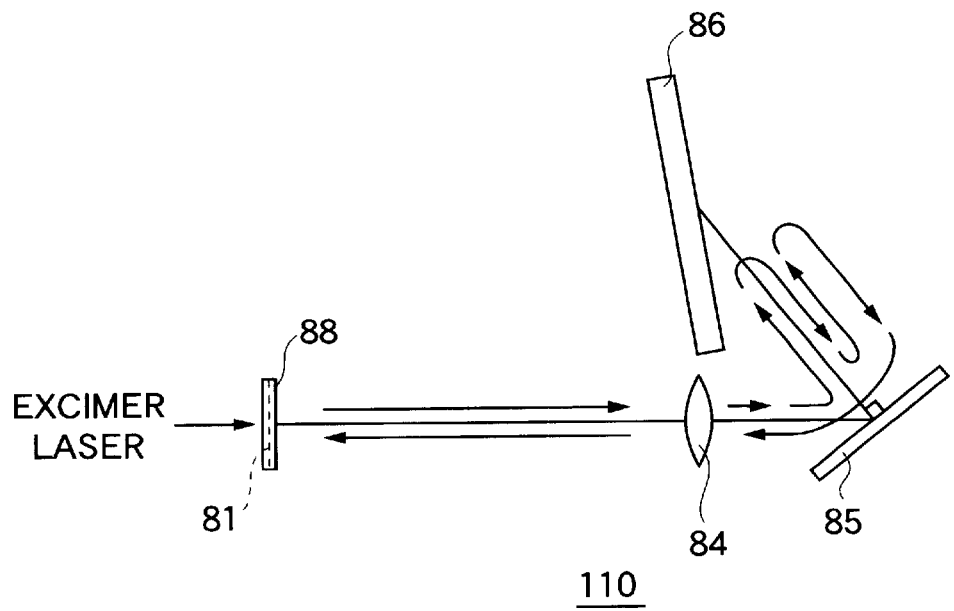
FIG. 21 is a side view showing constitution of a spectrometer according to a 11th embodiment of the present invention.
Figure 22:
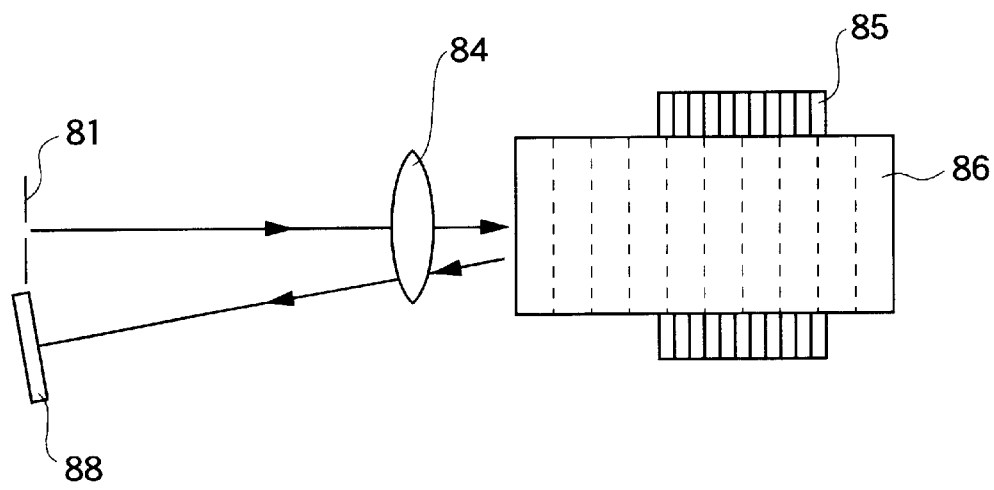
FIG. 22 is a plan view of the spectrometer as shown in FIG. 11.

As shown in FIG. 22, slit board 81 and line sensor 88 are arranged side by side in a side direction of the spectrometer. As shown in FIG. 21, slit board 81 and line sensor 88 are overlapped with each other from a side view of the spectrometer. On this account, the double pass obtained in the same manner as the eighth embodiment is transmitted along with a different path from the path from slit board 81 through collimator lens 84 to holographic grating 85, and focuses on the channel of line sensor 88.

The most remarkable characteristic of the spectrometer 110 is that slit board 81 and line sensor 88 are arranged side by side in a side direction of the spectrometer as mentioned above. According to the present embodiment, the same effect as the eighth embodiment can be achieved and a size of the apparatus is reduced.

The 12th Embodiment

Figure 23:
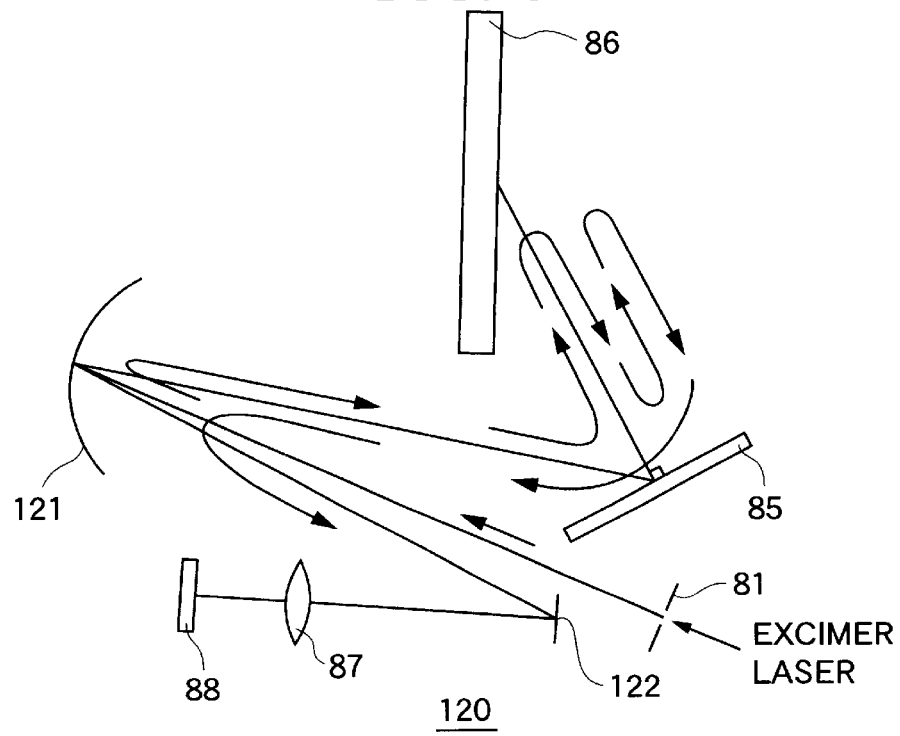
FIG. 23 is a diagram showing constitution of a spectrometer according to a 12th embodiment of the present invention.

Next, the 12th embodiment of the present invention will be explained with referring to FIG. 23. Spectrometer 120 according to the present embodiment is constructed by adding concave mirror 121 and mirror 122 instead of eliminating collimator lens 84 in the constitution of spectrometer 110 as shown in FIG. 21.

Concave mirror 121 makes the light that passed through slit board 81 to be parallel light and reflects it toward holographic grating 85 and reflects the double pass obtained in the same manner as the first embodiment toward mirror 122. The double pass is reflected by mirror 122 to change its light path. Line sensor 88 is arranged to focus the light reflected by mirror 122 on its channel.

The most remarkable characteristic of spectrometer 120 is that concave mirror 121 is used instead of collimator lens 84 in the constitution of spectrometer 110 as shown in FIG. 21. The concave mirror 121, different from collimator lens 84, causes no chromatic aberration. According to the present embodiment, the same effect as the eighth embodiment can be achieved and diversity is realized to deal with different wavelengths.

The 13th Embodiment

Figure 24:
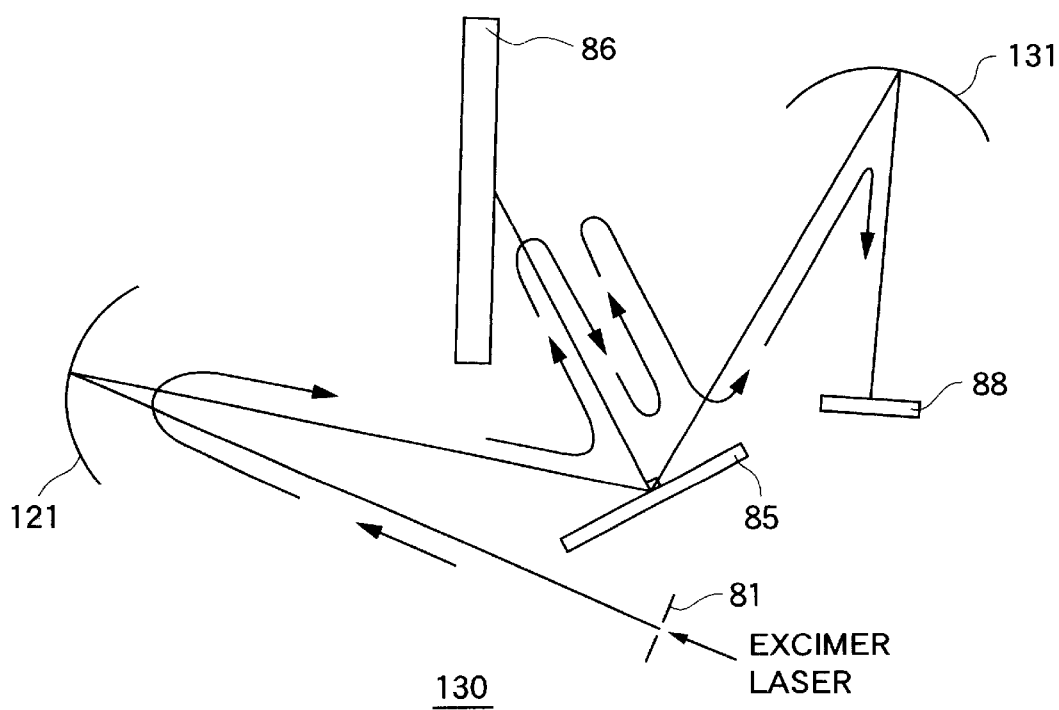
FIG. 24 is a diagram showing constitution of a spectrometer according to the 13th embodiment of the present invention.

Next, the 13th embodiment of the present invention will be explained with referring to FIG. 24. Spectrometer 130 according to the present embodiment is constructed by adding concave mirror 131 instead of eliminating mirror 122 in the constitution of spectrometer 120 as shown in FIG. 23.

Concave mirror 121 is used to change the light that passed through slit board 81 into parallel light and reflect it toward holographic grating 85.

Holographic grating 85 is arranged to diffract parallel light incident from collimator lens 84 with an outgoing angle of 0 so that the diffracted parallel light goes and returns two times between holographic grating 85 and Echelle grating 86 and to diffract the parallel light obtained by the twice round trips with a negative outgoing angle. The double pass obtained in the same manner as the eighth embodiment is output from holographic grating 85 with this negative outgoing angle.

Concave mirror 131 is arranged to reflect parallel light incident from holographic grating 85 toward line sensor 88.

The light reflected by the concave mirror 131 focuses on the channel of line sensor 88.

The most remarkable characteristic of the spectrometer 130 is that concave mirror 131 is added to the constitution similar to spectrometer 120 according to the 12th embodiment. According to this embodiment, the same effect as the 12th embodiment can be achieved and two concave lenses cancel each other's aberration to obtain higher resolving power.

The 14th Embodiment

Figure 25:
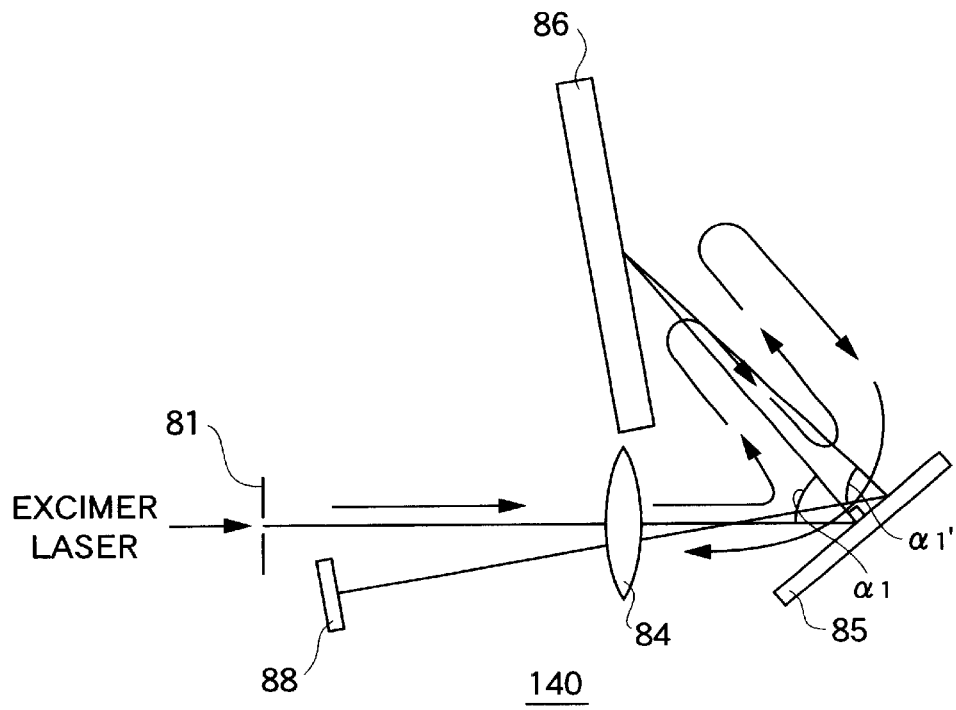
FIG. 25 is a diagram showing constitution of a spectrometer according to a 14th embodiment of the present invention.

Next, the 14th embodiment of the present invention will be explained with referring to FIG. 25.

Holographic grating 85 is adjusted to be arranged such that it diffracts the parallel light incident from collimator lens 84 with an outgoing angle of 0° and diffracts the parallel light, which has gone and returned two times between holographic grating 85 and Echelle grating 86, with an outgoing angle $\alpha_1'$ ($<\alpha_1$).

Echelle grating 86 is arranged to diffract the parallel light incident from holographic grating .85 under a diffraction order $m_2$ so that the diffracted parallel light goes and returns once between Echelle grating 86 and holographic grating 85, and to diffract thus obtained parallel light under a diffraction order $m_2'$ ($\neq m_2$). That is, the first time diffraction order $m_2$ and the second time diffraction order $m_2'$ in Echelle grating 86 are selected to be different from each other.

The most remarkable characteristic of the spectrometer 140 is that the first time diffraction order and the second time diffraction order in Echelle grating 86 are selected to be different from each other. According to the present embodiment, the same effect as the first embodiment can be obtained, and the light forwarding from slit board 81 to holographic grating 85 and the output light have different angles so that a position of slit board 81 and a position of line sensor 88 are never overlapped in the arrangement.

The 15th Embodiment

Figure 26:
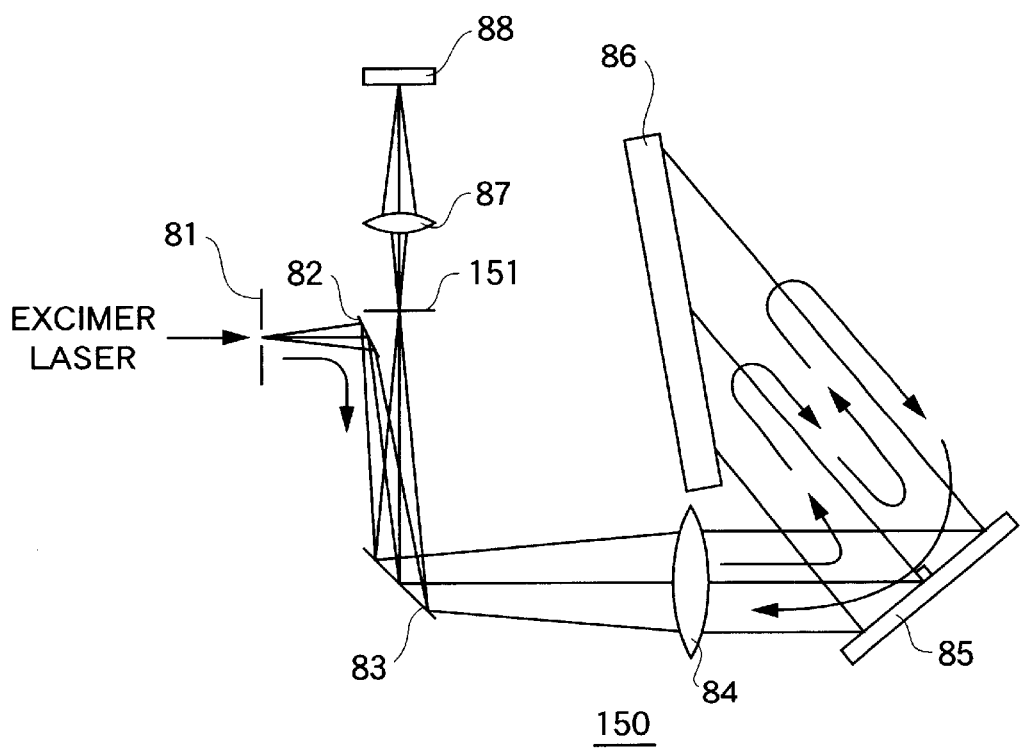
FIG. 26 is a diagram showing constitution of a spectrometer according to a 15th embodiment of the present invention.

Next, the 15th embodiment of the present invention will be explained with referring to FIG. 26. Spectrometer 150 according to the present embodiment is constructed by adding fluorescence glass board 151 to the constitution of spectrometer 80 as shown in FIG. 8.

Fluorescence glass board 151 is a kind of optical element for emitting visible light having a predetermined wavelength (for example, the wavelength of green light) from the portion where ultraviolet light is irradiated. Fluorescence glass board 151 is arranged at the focus position of the double pass reflected by mirror 83.

The most remarkable characteristic of spectrometer 150 is that fluorescence glass board 151 is added to the constitution similar to spectrometer 80 according to the eighth embodiment. On this account, a lens for visible light can be used as magnifier lens 87, and therefore, a lens having a larger expansion rate can be used. Further, line sensor 88 may employ elements for visible light and elements each having a smaller size can be chosen. According to the present embodiment, the dispersion value can be made smaller than that in the eighth embodiment and even higher resolving power can be realized.

The 16th Embodiment

Figure 27:
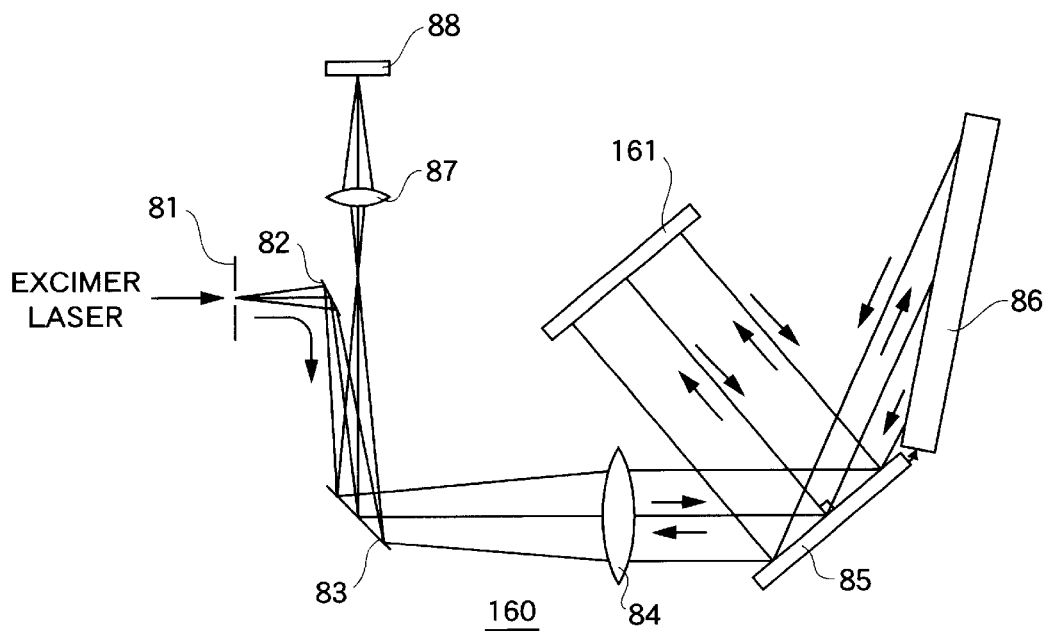
FIG. 27 is a diagram showing constitution of a spectrometer according to a 16th embodiment of the present invention.

Next, the 16th embodiment of the present invention will be explained with referring to FIG. 27. Spectrometer 160 according to the present embodiment is constructed by adding mirror 161 to the constitution of spectrometer 80 as shown in FIG. 8.

Holographic grating 85 is adjusted to be arranged such that it diffracts parallel light incident from collimator lens 84 with an outgoing angle of 0°, the diffracted parallel light is reflected by mirror 161, then holographic grating 85 diffracts the reflected parallel light with a negative outgoing angle, the diffracted parallel light is diffracted by Echelle grating 86, then holographic grating 85 diffracts again the diffracted parallel light with an outgoing angle of 0°, the diffracted parallel light is reflected by mirror 161, then holographic grating 85 diffracts the reflected parallel light with a negative outgoing angle, the diffracted parallel light is again diffracted by Echelle grating 86 and then holographic grating 85 diffracts the diffracted parallel light toward collimator lens 84 with a positive outgoing angle.

Mirror 161 is arranged to reflect the parallel light incident from holographic grating 85 toward holographic grating 85. Echelle grating 86 is arranged to diffract incident parallel light, which is reflected by mirror 161 and then incident from holographic grating 85, toward holographic grating 85 so that the diffracted parallel light goes and returns two times between holographic grating 85 and mirror 161.

The most remarkable characteristic of the spectrometer 160 is that the parallel light is diffracted more times than spectrometer 80 according to the eighth embodiment. In the present embodiment, a number of times of diffraction of the parallel light is increased from that in the eighth embodiment owing to diffraction by holographic grating 85 when parallel light goes and returns two times between holographic grating 85 and mirror 161. According to the present embodiment, the dispersion value can be made smaller than that in the eighth embodiment and even higher resolving power can be realized.

The 17th Embodiment

Figure 28:
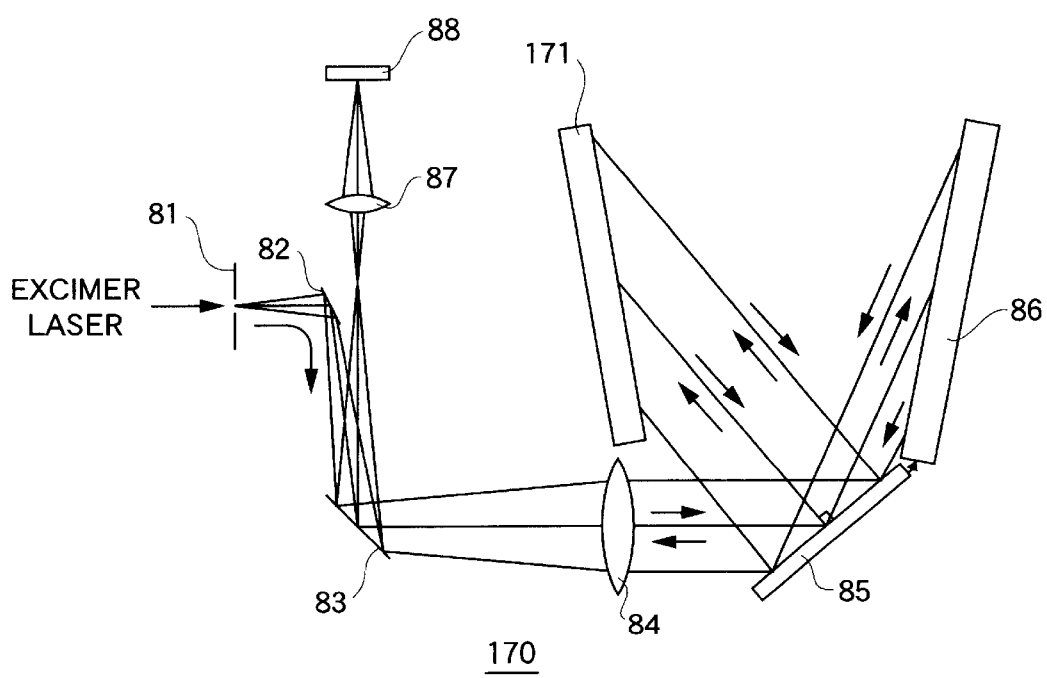
FIG. 28 is a diagram showing constitution of a spectrometer according to a 17th embodiment of the present invention.

Next, the 17th embodiment of the present invention will be explained with referring to FIG. 28. Spectrometer 170 according to the present embodiment is constructed by adding Echelle grating 171 instead of eliminating mirror 161 in the constitution of spectrometer 160 as shown in FIG. 27.

Holographic grating 85 is adjusted to be arranged such that it diffracts the parallel light incident from collimator lens 84 with an outgoing angle of 0°, the diffracted parallel light goes and returns two times between holographic grating 85 and Echelle grating 171, then holographic grating 85 diffracts the parallel light obtained by the twice round trips with a negative outgoing angle, the diffracted parallel light goes and returns two times between holographic grating 85 and Echelle grating 86 and then holographic grating 85 diffracts the parallel light obtained by the twice round trips toward collimator lens 84.

Echelle grating 171 is arranged to reflect parallel light incident from holographic grating 85 toward holographic grating 85.

Echelle grating 86 is arranged to diffract parallel light, which has gone and returned two times between holographic grating 85 and Echelle grating 171 and then incident from holographic grating 85, toward holographic grating 85 so that the diffracted parallel light goes and returns two times between holographic grating 85 and Echelle grating 86.

The most remarkable characteristic of spectrometer 170 is that the parallel light is diffracted more times than spectrometer 150 according to the 15th embodiment. In the present embodiment, a number of times of diffraction of the parallel light is increased than that in the 15th embodiment owing to the diffraction by Echelle grating 171. According to the present embodiment, the dispersion value can be made smaller than that of the 15th embodiment and even the higher resolving power can be realized.

The 18th Embodiment

Figure 29:
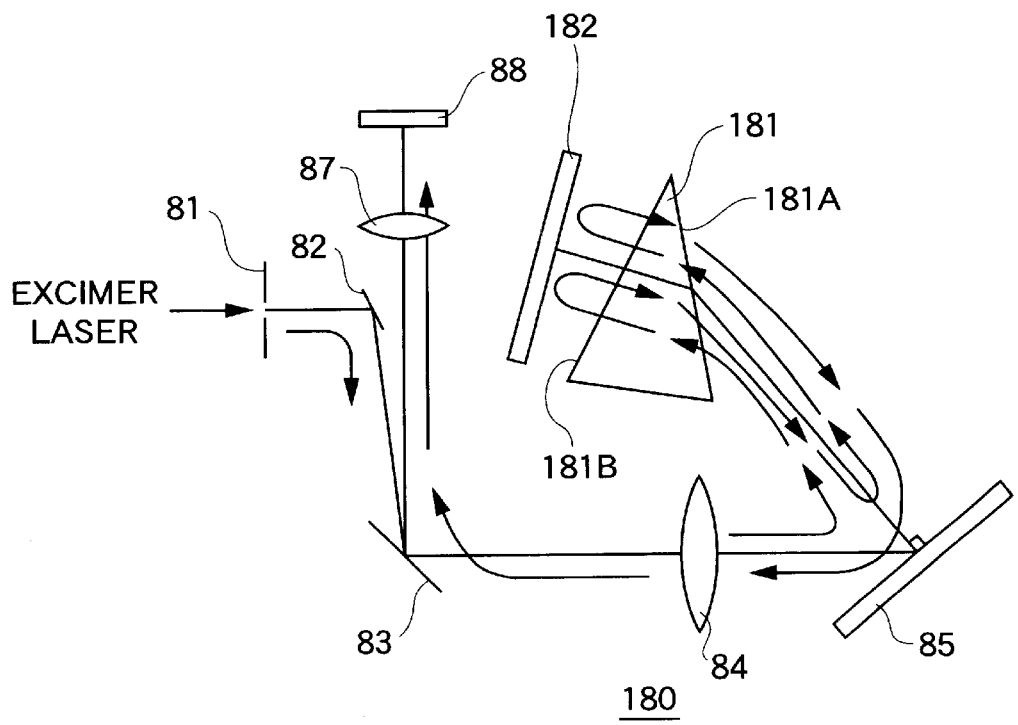
FIG. 29 is a diagram showing constitution of a spectrometer according to a 18th embodiment of the present invention.

Next, the 18th embodiment of the present invention will be explained with referring to FIG. 29. Spectrometer 180 in the present invention is constructed by adding prism 181 and mirror 182 instead of eliminating Echelle grating 86 in the constitution of spectrometer 80 as shown in FIG. 8.

Prism 181 is arranged to refract two times the parallel light incident from holographic grating 85 at surfaces 181A and 181B and transmit the parallel light toward mirror 182. On the other hand, mirror 182 is arranged to reflect the parallel light incident from prism 181 toward the incident light path.

On this account, the parallel light outgoing from holographic grating 85 with an outgoing angle 0° goes and returns two times between holographic grating 85 and mirror 182 through prism 181 and is diffracted by holographic grating 85 toward collimator lens 84 as the double pass.

The most remarkable characteristic of spectrometer 180 is that prism 181 and mirror 182 serve as a substitute for Echelle grating 86 in the eighth embodiment. According to the present embodiment, the same effect as the eighth embodiment can be achieved and measurement with a higher S/N ratio is possible because the light intensity loss of a prism is less than that of a diffraction grating.

The 19th Embodiment

Figure 30:
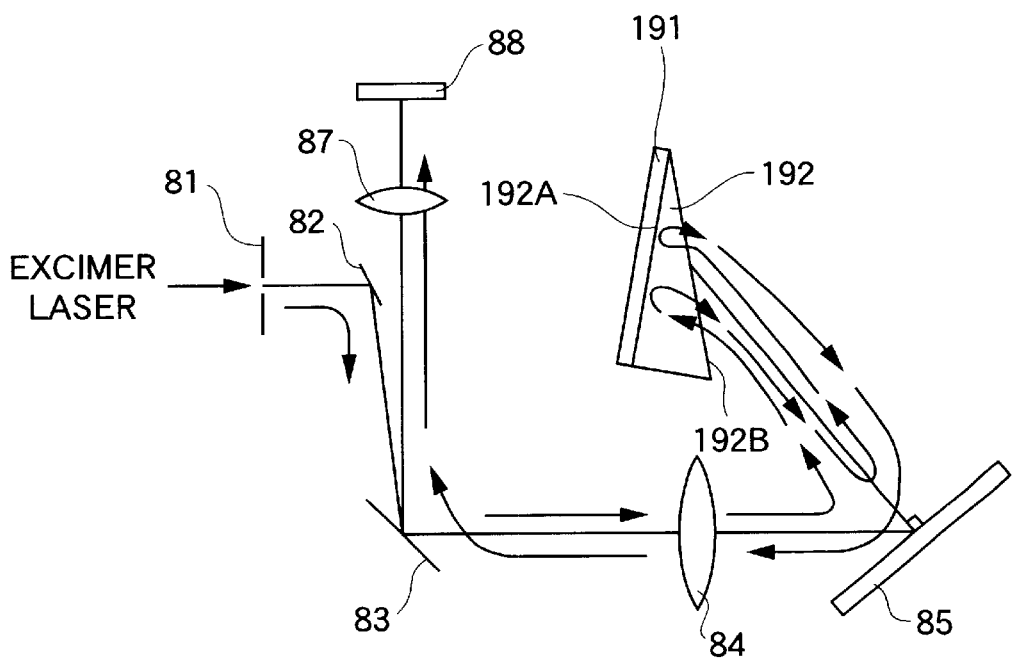
FIG. 30 is a diagram showing constitution of a spectrometer according to a 19th embodiment of the present invention.

Next, the 19th embodiment of the present invention will be explained with referring to FIG. 30. Spectrometer 190 according to the present embodiment is constructed by adding prism 192, in which reflection membrane 191 is disposed on one surface, instead of eliminating Echelle grating 86 and magnifier lens 87 in the constitution of spectrometer 80 as shown in FIG. 11.

Reflection membrane 191 is attached on surface 192A of prism 192. Prism 192 is arranged to refract the parallel light incident from holographic grating 85 at surface 192B and reflect the parallel light by reflection membrane 191 with an angle of 90°.

On this account, the parallel light outgoing from holographic grating 85 with an outgoing angle of 0° goes and returns two times between holographic grating 85 and reflection membrane 191 through prism 192 and is diffracted by holographic grating 85 toward collimator lens 84 as the double pass.

The most remarkable characteristic of spectrometer 190 is that prism 192, on which reflection membrane 191 is disposed, serves as a substitute for Echelle grating 86 in the eighth embodiment.

According to the present embodiment, the same effect as the eighth embodiment can be achieved.

As mentioned above, according to the present invention, the dispersion value can be reduced without lengthening the focal length of collimating means. Accordingly, higher resolving power can be realized without enlarging a size of the apparatus. In particular, in the case where the first diffraction means includes at least one holographic grating and the holographic grating is arranged to output the parallel light incident from collimating means with an outgoing angle of 0°, still higher resolving power can be realized.

What is claimed is:

1. A spectrometer for detecting a specified spectrum line included in incident light including plural spectrum lines having different wavelengths, said spectrometer comprising:

first diffraction means for diffracting incident light with a first diffraction order and reflecting the light including a specified wavelength component into a predetermined direction;

second diffraction means for diffracting the light reflected from said first diffraction means with a second diffraction order higher than the first diffraction order and reflecting the light to said first diffraction means such that the light goes and returns a predetermined number of times between said first diffraction means and said second diffraction means; and detection means, having plural light detection elements arranged in at least one direction, for detecting the light which has gone and returned the predetermined number of times between said first diffraction means and said second diffraction means.

2. The spectrometer according to claim 1, wherein said second diffraction means is used in an arrangement which is shifted within a predetermined angle from a Littrow arrangement, whereby an incident angle is equal to an outgoing angle.

3. The spectrometer according to claim 1, wherein:

said first diffraction means includes one of a holographic grating, an ion etched grating, a blazed grating, an Echellete grating and a concave grating; and said second diffraction means includes one of an Echelle grating and a blazed grating.

4. The spectrometer according to claim 2, wherein:

said first diffraction means includes one of a holographic grating, an ion etched grating, a blazed grating, an Echellete grating and a concave grating; and said second diffraction means includes one of an Echelle grating and a blazed grating.

5. A spectrometer for detecting a specified spectrum line included in incident light including plural spectrum lines having different wavelengths, said spectrometer comprising:

detection means, having plural light detection elements arranged in at least one direction, for detecting the specified spectrum line;

first diffraction means for diffracting incident light with a first diffraction order, grooves being formed in said first diffraction means with such density that said detection means can detect the specified spectrum line; and second diffraction means for diffracting incident light with a second diffraction order higher than the first diffraction order, grooves being formed in said second diffraction means with less density than that in said first diffraction means, wherein light diffracted by said first diffraction means is incident into said second diffraction means, the light diffracted by said second diffraction means returns to said first diffraction means and the light diffracted by said first diffraction means is incident into said detection means.

6. The spectrometer according to claim 5, wherein:

said first diffraction means includes one of a holographic grating, an ion etched grating, a blazed grating, an Echellete grating and a concave grating; and said second diffraction means includes one of an Echelle grating and a blazed grating.

7. A spectrometer for detecting a specified spectrum line included in incident light including plural spectrum lines having different wavelengths, said spectrometer comprising:

detection means, having plural light detection elements arranged in at least one direction, for detecting the specified spectrum line;

a collimating means for changing light supplied from a light source into parallel light;

first diffraction means for diffracting the parallel light including a specified wavelength component into a predetermined direction;

second diffraction means for diffracting the parallel light diffracted by said first diffraction means toward said first diffraction means such that the parallel light goes and returns a predetermined number of times between said first diffraction means and said second diffraction means; and focusing means for focusing the parallel light, which has gone and returned the predetermined number of times between said first diffraction means and said second diffraction means, on said detection means.

8. A spectrometer according to claim 7, wherein:

said first diffraction means includes a holographic grating; and said second diffraction means includes an Echelle grating.

9. The spectrometer according to claim 8, wherein:

said Echelle grating is arranged to be rotated by a slight angle from a Littrow arrangement where an incident angle is equal to an outgoing angle; and said slight angle is determined on the basis of (i) a number of times the parallel light goes and returns between said holographic grating and said Echelle grating, and (ii) a relative position of said detection means.

10. The spectrometer according to claim 8, wherein said holographic grating is arranged to reflect the parallel light incident from said collimating means with an outgoing angle of 0°.

11. The spectrometer according to claim 9, wherein said parallel light goes and returns between said holographic grating and said Echelle grating by using direct reflection at said holographic grating.

12. The spectrometer according to claim 10, wherein said parallel light goes and returns between said holographic grating and said Echelle grating by using direct reflection at said holographic grating.

13. A spectrometer for detecting a specified spectrum line included in incident light including plural spectrum lines having different wavelengths, said spectrometer comprising:

first diffraction means for diffracting incident light with a first diffraction order and reflecting the light including a specified wavelength component into a predetermined direction;

second diffraction means for diffracting the light reflected from said first diffraction means with a second diffraction order and reflecting the light into a predetermined direction;

third diffraction means for diffracting the light reflected from said second diffraction means with a third diffraction order higher than the first and second diffraction orders and reflecting the light to said second diffraction means such that the light goes and returns a predetermined number of times between said first diffraction means and said third diffraction means through said second diffraction means; and detection means, having plural light detection elements arranged in at least one direction, for detecting the light which has gone and returned the predetermined number of times between said first diffraction means and said third diffraction means through said second diffraction means.

* * * * *